(12) United States Patent
Shishikura

(10) Patent No.: US 11,802,254 B2
(45) Date of Patent: Oct. 31, 2023

(54) GREASE COMPOSITION

(71) Applicant: IDEMITSU KOSAN CO., LTD., Chiyoda-ku (JP)

(72) Inventor: Akihiro Shishikura, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 17/434,784

(22) PCT Filed: Feb. 27, 2020

(86) PCT No.: PCT/JP2020/007974
§ 371 (c)(1),
(2) Date: Aug. 30, 2021

(87) PCT Pub. No.: WO2020/179603
PCT Pub. Date: Sep. 10, 2020

(65) Prior Publication Data
US 2022/0162513 A1    May 26, 2022

(30) Foreign Application Priority Data
Mar. 6, 2019   (JP) ................................. 2019-040941

(51) Int. Cl.
*C10M 115/08*    (2006.01)
*C10M 169/02*    (2006.01)
(Continued)

(52) U.S. Cl.
CPC ........ *C10M 115/08* (2013.01); *C10M 169/02* (2013.01); *C10M 169/04* (2013.01);
(Continued)

(58) Field of Classification Search
CPC .......................... C10M 115/08; C10M 169/02; C10M 169/04; C10M 2207/125; C10M 2215/064;
(Continued)

(56) References Cited

U.S. PATENT DOCUMENTS 9,765,821 B2 * 9/2017 Kawamura .......... C10M 105/04
2018/0037842 A1 * 2/2018 Suetsugu ............. B01J 19/1806

FOREIGN PATENT DOCUMENTS

CN    107207993 A    9/2017
CN    113348234      9/2021
(Continued)

OTHER PUBLICATIONS

International Search Report dated May 26, 2020 in PCT/JP2020/007974 filed on Feb. 27, 2020. 3 pages.
(Continued)

*Primary Examiner* — James C Goloboy
(74) *Attorney, Agent, or Firm* — Oblon, McClelland, Maier & Neustadt, L.L.P.

(57) ABSTRACT

A grease composition may be used for speed reducers and speed increasers, being excellent in both torque transmission efficiency and leak prevention performance. The grease composition may contain a base oil (A) and a urea-based thickener (B), which is used for speed reducers and speed increasers, wherein the particles containing the urea-based thickener (B) in the grease composition satisfy the following requirement (I). Requirement (I): the area-based arithmetic average particle diameter of the particles is 2.0 μm or less, as measured by a laser diffraction/scattering method.

11 Claims, 4 Drawing Sheets

(51) Int. Cl.
*C10M 169/04* (2006.01)
*C10N 20/02* (2006.01)
*C10N 20/06* (2006.01)
*C10N 30/04* (2006.01)
*C10N 30/06* (2006.01)
*C10N 30/10* (2006.01)
*C10N 30/12* (2006.01)
*C10N 30/14* (2006.01)
*C10N 40/04* (2006.01)
*C10N 50/10* (2006.01)
*C10N 70/00* (2006.01)

(52) U.S. Cl.
CPC . *C10M 2207/125* (2013.01); *C10M 2215/064* (2013.01); *C10M 2215/1026* (2013.01); *C10M 2217/0456* (2013.01); *C10M 2219/024* (2013.01); *C10M 2219/044* (2013.01); *C10M 2219/068* (2013.01); *C10N 2020/02* (2013.01); *C10N 2020/06* (2013.01); *C10N 2030/04* (2013.01); *C10N 2030/06* (2013.01); *C10N 2030/10* (2013.01); *C10N 2030/12* (2013.01); *C10N 2030/14* (2013.01); *C10N 2040/04* (2013.01); *C10N 2050/10* (2013.01); *C10N 2070/00* (2013.01)

(58) Field of Classification Search
CPC .. C10M 2215/1026; C10M 2217/0456; C10M 2219/024; C10M 2219/044; C10M 2219/068; C10N 2020/02; C10N 2020/06; C10N 2030/04; C10N 2030/06; C10N 2030/10; C10N 2030/12; C10N 2030/14; C10N 2040/04; C10N 2050/10; C10N 2070/00
See application file for complete search history.

(56) References Cited

FOREIGN PATENT DOCUMENTS

| CN | 113490733 | 10/2021 |
|---|---|---|
| EP | 3 255 130 A1 | 12/2017 |
| EP | 3 747 978 A1 | 12/2020 |
| EP | 3 851 506 A1 | 7/2021 |
| EP | 3 919 592 A1 | 12/2021 |
| EP | 3 936 590 A1 | 1/2022 |
| JP | 11-21580 A | 1/1999 |
| JP | 2004-75041 A | 3/2004 |
| JP | 2004-231714 A | 8/2004 |
| JP | 2005-47938 A | 2/2005 |
| JP | 2005-247971 A | 9/2005 |
| JP | 2007-231207 A | 9/2007 |
| JP | 2008-309336 A | 12/2008 |
| JP | 2011-42747 A | 3/2011 |
| JP | 2013-91799 A | 5/2013 |
| JP | 2016-153506 A | 8/2016 |
| JP | 2017-115109 A | 6/2017 |
| JP | 2018-115235 A | 7/2018 |
| WO | WO 2016/125859 A1 | 8/2016 |
| WO | WO 2018/216569 A1 | 11/2018 |

OTHER PUBLICATIONS

Combined Chinese Office Action and Search Report dated Jun. 27, 2022 in Patent Application No. 202080018644.7 (with English language translation and English translation of Category of Cited Documents), 19 pages.

Ju, "Grand Great Grease Technology," Sinopec, 1st Print, 1st Edition, Apr. 2005, 2 pages.

Jiang Ming-jun, et al., "Research Development of Low Noise Grease Used in Precision Rolling Bearings," Journal of Logistical Engineering University, vol. 26, No. 5, Sep. 2010, pp. 22-27 (with English Abstract).

Extended European Search Report dated Nov. 17, 2022 in European Patent Application No. 20765480.7, 11 pages.

Office Action dated Dec. 7, 2022, in corresponding Chinese Patent Application No. 202080018644.7.

Office Action dated Jul. 18, 2023, in corresponding JP Application No. 2021-504015 with English translation (provided by Global Dossier).

* cited by examiner

GREASE COMPOSITION

CROSS-REFERENCE TO RELATED APPLICATIONS

The present application is the national stage of international application PCT/JP2020/007974, filed on Feb. 27, 2020, and claims the benefit of the filing date of Japanese Appl. No. 2019-040941, filed on Mar. 6, 2019.

TECHNICAL FIELD

The present invention relates to a grease composition. More precisely, the present invention relates to a grease composition for use for speed reducers and speed increasers.

BACKGROUND ART

Grease easily performs sealing as compared with a lubricating oil, and enables downsizing and weight saving of machines to which it is applied. Consequently, grease is widely used for lubrication of various slide parts in automobiles, electric appliances, industrial machines and engineering machines.

Recently, grease has become also used in speed reducers for use for industrial robots and in speed increasers for use for wind power facilities.

Speed reducers have a mechanism such that by adding a torque to the input side, the torque is transmitted to the output side after speed reduction.

Speed increasers have a mechanism such that by adding a torque to the input side, the torque is transmitted to the output side after speed increase.

Grease for use in lubrication parts in speed reducers and speed increasers is required to have an excellent torque transmission efficiency from the viewpoint of transmitting the torque added to the input side toward the output side with zero waste.

Here, the lubrication parts in speed reducers and speed increasers are often given a high load during torque transmission, and therefore the members constituting such lubrication parts are often worn and seized. When the members constituting the lubrication parts are worn and seized, the torque on the output side varies. Consequently, grease for use in the lubrication parts of speed reducers and speed increasers is also required to have an ability to suppress as much as possible abrasion and seizure in the lubrication parts.

For example, PTL 1 describes that, using a grease composition containing a base oil, a thickener, molybdenum dithiophosphate and a calcium salt such as calcium sulfonate for a speed reducer, damage of metal contact parts at high temperatures can be reduced and the speed reducer can have a prolonged lifetime.

CITATION LIST

Patent Literature

PTL 1: JP 2011-042747 A

SUMMARY OF INVENTION

Technical Problem

In the case where grease excellent in torque transmission efficiency is prepared, it is general to prepare a soft grease having an increased worked penetration. However, in the case where such a soft grease having an increased worked penetration is used, there occurs a problem that the leak prevention performance of the grease lowers. When a grease poor in leak prevention performance is used, grease leak may occur in the lubrication parts of speed reducers and speed increasers. In addition, also in the case where a grease in which the proportion of a thickener and additives is large is used, grease leak may also occur frequently. Consequently, the supply amount of grease in the lubrication parts may gradually reduce, therefore often causing abrasion and seizure in the members constituting the lubrication parts. Moreover, as mentioned above, a high load is often given to the lubrication parts in speed reducers and speed increases during torque transmission. Consequently, when the grease supply amount in the lubrication parts gradually reduces, abrasion and seizure may noticeably occur in the members constituting the lubrication parts.

Accordingly, it is desired to improve leak prevention performance of grease, but when the worked penetration of grease is increased for the purpose of improving the torque transmission of grease, leak prevention performance of grease could not be sufficiently secured and, as a result, there still remains a problem that wear resistance and load bearing performance could not also be sufficiently secured.

The present invention addresses a problem of providing a grease composition for speed reducers and speed increasers, excellent both in torque transmission efficiency and in leak prevention performance.

Solution to Problem

The present inventor has specifically noted, in a grease composition containing a base oil and an urea-based thickener, the particle size of the particles containing the urea-based thickener in the grease composition. With that, the inventor has found that a grease composition, in which the particles are so controlled as to have an area-based arithmetic average particle size falling within a predetermined range, as measured according to a laser diffraction/scattering method, can solve the above-mentioned problems, and has completed the present invention.

Specifically, the present invention relates to the following to [12].

[1] A grease composition containing a base oil (A) and a urea-based thickener (B), which is used for speed reducers and speed increasers, wherein:
the particles containing the urea-based thickener (B) in the grease composition satisfy the following requirement (I).
Requirement (I): the area-based arithmetic average particle diameter of the particles is 2.0 μm or less, as measured by a laser diffraction/scattering method.
[2] The grease composition according to the above wherein the particles containing the urea-based thickener (B) in the grease composition further satisfy the following requirement (II).
Requirement (II): the specific surface area of the particles is $0.5 \times 10^5$ cm$^2$/cm$^3$ or more, as measured by a laser diffraction/scattering method.
[3] The grease composition according to the above [1] or [2], further containing an extreme pressure agent (C) of one or more selected from an organic metal-based extreme pressure agent, a sulfur-based extreme pressure agent, a phosphorus-based extreme pressure agent, and a sulfur-phosphorus-based extreme pressure agent.
[4] The grease composition according to any of the above [1] to [3], wherein the base oil (A) is one or more selected from a mineral oil, a hydrocarbon-based oil, an aromatic oil, an ester-based oil and an ether-based oil.

[5] The grease composition according to any of the above [1] to [4], wherein the kinematic viscosity at 40° C. of the base oil (A) is 10 to 400 mm²/s.

[6] The grease composition according to any of the above [1] to [5], wherein the content of the urea-based thickener (B) is 1 to 15% by mass based on the total amount of the grease composition.

[7] The grease composition according to any of the above [1] to [6], having a worked penetration at 25° C. of 240 to 450.

[8] The grease composition according to any of the above [1] to [7], wherein the urea-based thickener (B) is one or more selected from a diurea compound represented by the following general formula (b1).

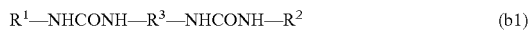

$$R^1\text{—NHCONH—}R^3\text{—NHCONH—}R^2 \quad (b1)$$

In the general formula (b1), $R^1$ and $R^2$ each independently represent a monovalent hydrocarbon group having 6 to 24 carbon atoms, and $R^1$ and $R^2$ may be the same as or different from each other. $R^3$ represents a divalent aromatic hydrocarbon group having 6 to 18 carbon atoms.

[9] The grease composition according to any of the above [1] to [8], further containing an additive (D) of one or more selected from an antioxidant, a rust inhibitor, a dispersant and a metal deactivator.

[10] A speed reducer having the grease composition of any of the above [1] to [9] in a lubrication part.

[11] A speed increaser having the grease composition of any of the above [1] to [9] in a lubrication part.

[12] A lubrication method for lubricating a lubrication part in a speed reducer or a speed increaser with the grease composition of any of the above [1] to [9].

Advantageous Effects of Invention

According to the present invention, there can be provided a grease composition for speed reducers and speed increasers, which is excellent in both torque transmission efficiency and leak prevention performance.

DESCRIPTION OF EMBODIMENTS

Figure 1:
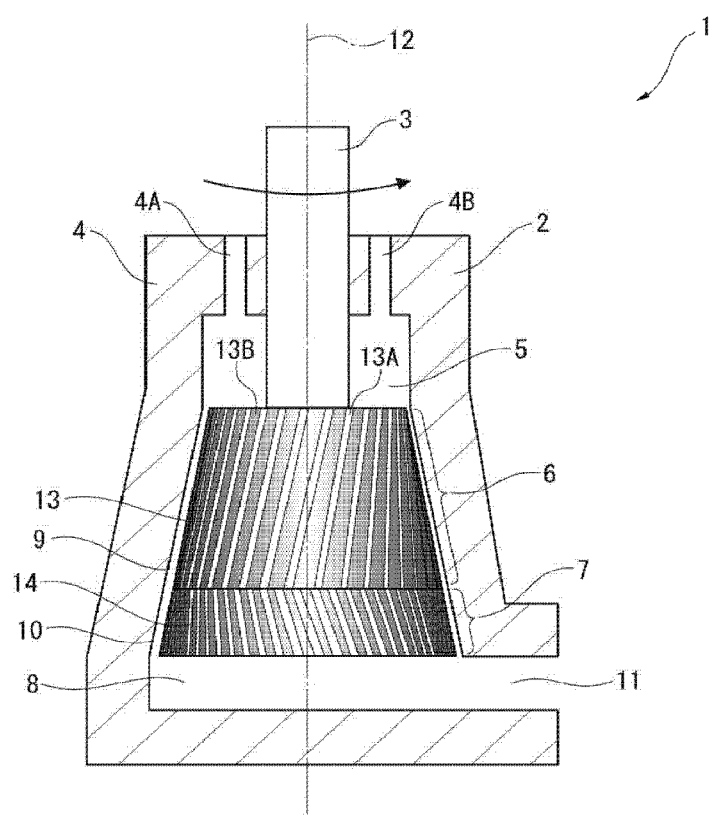
FIG. 1 is a schematic view of a cross section of a grease manufacturing apparatus, used in one embodiment of the present invention.

In the present specification, a lower limit and an upper limit stepwise described for a preferred numerical range (for example, a range of content) can be individually independently combined. For example, from a description of "preferably 10 to 90, more preferably 30 to 60", "a preferred lower limit (10)" and "a more preferred upper limit (60)" can be combined to be "10 to 60".

Also in the present specification, the numerical value in Examples is a numerical value usable as an upper limit or a lower limit.

[Grease Composition]

The grease composition of the present invention contains a base oil (A) and a urea-based thickener (B).

Preferably, the grease composition of one embodiment of the present invention contains an extreme pressure agent (C) of one or more selected from an organic metal-based extreme pressure agent, a sulfur-based extreme pressure agent, a phosphorus-based extreme pressure agent and a sulfur-phosphorus-based extreme pressure agent, in addition to the base oil (A) and the urea-based thickener (B).

In the following description, "base oil (A)" and "urea-based thickener (B)" may be referred to as "component (A)" and "component (B)", respectively. Also "extreme-pressure agent (C)" may be referred to as "component (C)".

In the grease composition of one embodiment of the present invention, the total content of the component (A) and the component (B) is, based on the total amount (100% by mass) of the grease composition, preferably 60% by mass or more, more preferably 70% by mass or more, even more preferably 80% by mass or more, further more preferably 90% by mass or more. In general, the total content is 100% by mass or less, preferably less than 100% by mass, more preferably 99% by mass or less, even more preferably 98% by mass or less.

In the case where the grease composition of one embodiment of the present invention further contains the component (C) along with the components (A) and (B), the total content of the components (A), (B) and (C) is preferably 65% by mass or more, more preferably 75% by mass or more, even more preferably 85% by mass or more, further more preferably 90% by mass or more, further more preferably 95% by mass or more. In general, the total content is 100% by mass or less, preferably less than 100% by mass, more preferably 99% by mass or less, even more preferably 98% by mass or less.

The grease composition of one embodiment of the present invention may contain any other component than the components (A), (B) and (C), within a range not detracting from the advantageous effects of the present invention.

<Requirement (I)>

The grease composition of the present invention is such that the particles containing the urea-based thickener in the grease composition satisfy the following requirement (I).

Requirement (I): the area-based arithmetic average particle diameter of the particles is 2.0 μm or less, as measured by a laser diffraction/scattering method.

Satisfying the requirement (I), the grease composition can be excellent both in torque transmission efficiency and in leak prevention performance.

The requirement (I) can be said to be a parameter that indicates the condition of aggregation of the urea-based thickener (B) in the grease composition.

Here, the "particles containing the urea-based thickener (B)" to be a target for measurement according to a laser diffraction/scattering method indicate particles formed by aggregation of the urea-based thickener contained in the grease composition.

In the case where the grease composition contains any other additive than the urea-based thickener (B), the particle diameter defined by the requirement (I) can be determined by measuring a grease composition prepared under the same condition but not adding the additive, according to a laser diffraction/scattering method. However, in the case where the additive is liquid at room temperature (25° C.) or where the additive dissolves in the base oil (A), a grease composition containing the additive may be employed as a target for measurement.

The urea-based thickener (B) is generally obtained by reacting an isocyanate compound and a monoamine compound, but the reaction speed is high, and therefore the resultant urea-based thickener (B) may readily aggregate to give excessive large particles (micelle particles, so-called "lumps"). As a result of assiduous studies, the present inventor has known that when the particle size defined by the above-requirement (I) is more than 2.0 μm, the grease composition cannot secure leak prevention performance in the case where the worked penetration of the grease composition is increased. On the other hand, the inventor has also known that, in the case where the worked penetration of the grease composition is lowered, the grease composition can secure leak prevention performance but becomes poor in torque transmission efficiency. Namely, the inventor has found that, when the particle size defined by the above requirement (I) is more than 2.0 μm, a grease composition excellent in both torque transmission efficiency and leak prevention performance is difficult to obtain.

As opposed to this, as a result of assiduous studies, the present inventor has known that when the particles are finely pulverized so as to have a particle size, as defined by the requirement (I), of 2.0 μm or less, the grease composition can be still excellent in leak prevention performance even when the worked penetration of the grease composition is increased, and therefore the grease composition can be excellent both in torque transmission efficiency and in leak prevention performance. As a result, the inventor has known that the grease composition is also excellent in wear resistance and load bearing performance.

The result is presumed to be because, when the particles are finely pulverized so as to have a particle size, as defined by the requirement (I), of 2.0 μm or less, the particles containing the urea-based thickener (B) can be readily penetrated into the lubrication parts (friction surfaces) in speed reducers and speed increasers and, in addition, can be hardly removed from the lubrication parts and, as a result, the retention force of the grease composition in the lubrication parts can improve. In addition, when the particles are finely pulverized so as to have a particle size, as defined by the requirement (I), of 2.0 μm or less, the holding force of the particles to hold the base oil (A) improves. Consequently, it is presumed that the effect of favorably spreading the base oil (A) to the lubrication parts (friction surfaces) of speed reducers and speed increasers can be improved and the wear resistance and the load bearing performance of the grease composition can be thereby improved.

From the above-mentioned viewpoint, in the grease composition of the present invention, the particle size defined by the requirement (I) is preferably 1.5 μm or less, more preferably 1.0 μm or less, even more preferably 0.9 μm or less, further more preferably 0.8 μm or less, further more preferably 0.7 μm or less, further more preferably 0.6 μm or less, further more preferably 0.5 μm or less, further more preferably 0.4 μm or less. In general, the particle size is 0.01 μm or more.

<Requirement (II)>

Here, the grease composition of one embodiment of the present invention preferably further satisfies the following requirement (II).

Requirement (II): the specific surface area of the particles is $0.5 \times 10^5$ cm$^2$/cm$^3$ or more, as measured by a laser diffraction/scattering method.

The specific surface area defined by the requirement (II) is a sidebar index that indicates the condition of fineness of the particles containing the urea-based thickener (B) in the grease composition and the presence of large particles (lumps) therein. Specifically, satisfying the requirement (I) and further satisfying the requirement (II), it is indicated that the condition of the fineness of the particles containing the urea-based thickener (B) in the grease composition is better and presence of large particles (lumps) is suppressed more. Accordingly, the grease composition of the type can be excellent both in torque transmission efficiency and in leak prevention performance and also excellent in wear resistance and load bearing performance.

From the above-mentioned viewpoint, the specific surface area defined by the requirement (II) is preferably $0.7 \times 10^5$ cm$^2$/cm$^3$ or more, more preferably $0.8 \times 10^5$ cm$^2$/cm$^3$ or more, even more preferably $1.2 \times 10^5$ cm$^2$/cm$^3$ or more, further more preferably $1.5 \times 10^5$ cm$^2$/cm$^3$ or more, further more preferably $1.8 \times 10^5$ cm$^2$/cm$^3$ or more, further more preferably $2.0 \times 10^5$ cm$^2$/cm$^3$ or more. The specific surface area is generally $1.0 \times 10^6$ cm$^2$/cm$^3$ or less.

In the present specification, the value defined by the requirement (I) and that defined by the requirement (II) are values measured according to the methods described in the section of Examples given below.

The value defined by the requirement (I) and that defined by the requirement (II) can be controlled mainly by the production condition for the urea-based thickener (B).

Paying attention to specific means for controlling the value defined by the requirement (I) and also the value defined by the requirement (II), details of the components contained in the grease composition of the present invention are described below.

<Base Oil (A)>

The base oil (A) contained in the grease composition of the present invention may be any base oil generally used in grease compositions, and examples thereof include one or more selected from mineral oils and synthetic oils.

Examples of mineral oils include a distillate obtained by subjecting a paraffinic crude oil, an intermediate base crude oil or a naphthenic crude oil to atmospheric distillation or reduced-pressure distillation, and a refined oil obtained by refining these distillates.

Examples of the purification method for obtaining a refined oil include a hydroreforming treatment, a solvent extraction treatment, a solvent dewaxing treatment, a hydroisomerization dewaxing treatment, a hydrorefining treatment, and a clay treatment.

Examples of the synthetic oil include a hydrocarbon-based oil, an aromatic oil, an ester-based oil, and an ether-based oil. In addition, a synthetic oil prepared by isomerizing a wax produced by a Fischer-Tropsch process (GTL wax) is also usable.

Examples of the hydrocarbon-based oil include a poly-α-olefin (PAO), such as normal paraffin, isoparaffin, polybutene, polyisobutylene, a 1-decene oligomer, and a cooligomer of 1-decene and ethylene; and a hydrogenated product thereof.

Examples of the aromatic oil include an alkylbenzene such as a monoalkylbenzene, and a dialkylbenzene; and an alkylnaphthalene such as a monoalkylnaphthalene, a dialkylnaphthalene, and a polyalkylnaphthalenes.

Examples of the ester-based oil include a diester-based oil, such as dibutyl sebacate, di-2-ethylhexyl sebacate, dioctyl adipate, diisodecyl adipate, ditridecyl adipate, ditridecyl glutarate, and methyl acetyl ricinolate; an aromatic ester-based oil, such as trioctyl trimellitate, tridecyl trimellitate, and tetraoctyl pyromellitate; a polyol ester-based oil, such as trimethylolpropane caprylate, trimethylolpropane pelargonate, pentaerythritol-2-ethylhexanoate, and pentaerythritol pelargonate; and a complex ester-based oil, such as an oligoester of a polyhydric alcohol with a mixed fatty acid of a dibasic acid and a monobasic acid.

Examples of the ether-based oil include a polyglycol, such as polyethylene glycol, polypropylene glycol, polyethylene glycol monoether, and polypropylene glycol monoether; and a phenyl ether-based oil, such as a monoalkyl triphenyl ether, an alkyl diphenyl ether, a dialkyl diphenyl ether, pentaphenyl ether, tetraphenyl ether, a monoalkyl tetraphenyl ether, and a dialkyl tetraphenyl ether.

Here, in the case where the grease composition is required to have oxidation stability at high temperatures, a synthetic oil is preferably used, and one or more selected from a hydrocarbon-based oil, an ester-based oil, and an ether-based oil are more preferably used. Using a hydrocarbon-based oil, an ester-based oil and an ether-based oil as mixed, a balance of heat resistance, sealing resistance and low-temperature characteristics can be secured.

The kinematic viscosity at 40° C. (hereinafter also referred to as "40° C. kinematic viscosity") of the base oil (A) for use in one embodiment of the present invention is preferably 10 to 400 mm$^2$/s, more preferably 15 to 300 mm$^2$/s, even more preferably 20 to 150 mm$^2$/s.

The base oil (A) for use in one embodiment of the present invention may be a mixed base oil of a high-viscosity base oil and a low-viscosity base oil, as combined so as to have a kinematic viscosity falling within the above range.

The viscosity index of the base oil (A) used in one embodiment of the present invention is preferably 70 or more, more preferably 80 or more, even more preferably 100 or more.

In the present specification, the kinematic viscosity and the viscosity index each mean a value measured or calculated according to JIS K2283:2000.

In the grease composition of one embodiment of the present invention, the content of the base oil (A) is, based on the total amount (100% by mass) of the grease composition, preferably 50% by mass or more, more preferably 55% by mass or more, even more preferably 60% by mass or more, further more preferably 65% by mass or more, and is preferably 98.5% by mass or less, more preferably 97% by mass or less, even more preferably 95% by mass or less, further more preferably 93% by mass or less.

<Urea-Based Thickener (B)>

The urea-based thickener (B) contained as a thickener in the grease composition of the present invention may be any compound having an urea bond, but is preferably a diurea compound having two urea bonds, more preferably a diurea compound represented by the following general formula (b1).

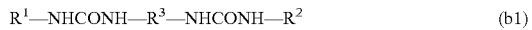    (b1)

The urea-based thickener (B) for use in one embodiment of the present invention may be one kind, or may be a mixture of two or more kinds.

In the general formula (b1), $R^1$ and $R^2$ each independently represent a monovalent hydrocarbon group having 6 to 24 carbon atoms, and $R^1$ and $R^2$ may be the same as or different from each other. $R^3$ represents a divalent aromatic hydrocarbon group having 6 to 18 carbon atoms.

The carbon number of the monovalent hydrocarbon group that can be selected for $R^1$ and $R^2$ in the general formula (b1) is 6 to 24, preferably 6 to 20, more preferably 6 to 18.

The monovalent hydrocarbon group that can be selected for $R^1$ and $R^2$ includes a saturated or unsaturated monovalent linear hydrocarbon group, a saturated or unsaturated monovalent alicyclic hydrocarbon group, and a monovalent aromatic hydrocarbon group.

Here, when the content of the linear hydrocarbon group in $R^1$ and $R^2$ in the general formula (b1) is referred to as an X mol equivalent, the content of the alicyclic hydrocarbon group is as an Y mol equivalent, and the content of the aromatic hydrocarbon group is as a Z mol equivalent, preferably, the following requirements (a) and (b) are satisfied.

Requirement (a): A value of $[(X+Y)/(X+Y+Z)] \times 100$ is 90 or more (preferably 95 or more, more preferably 98 or more, even more preferably 100).

Requirement (b): A ratio of X/Y is 0/100 (X=0, Y=100) to 100/0 (X=100, Y=0) (preferably 10/90 to 90/10, more preferably 20/80 to 80/20, even more preferably 40/60 to 80/20).

The alicyclic hydrocarbon group, the linear hydrocarbon group and the aromatic hydrocarbon groups are groups that are selected as $R^1$ and $R^2$ in the general formula (b1), and therefore the sum total of the values of X, Y and Z is 2 molar equivalent relative to one mol of the compound represented by the general formula (b1). The values of the requirements (a) and (b) mean average values relative to all the amount of the compound group represented by the general formula (b1) contained in the grease composition.

Using a compound represented by the general formula (b1) and satisfying the requirements (a) and (b), a grease composition can be readily provided here, which is excellent in both torque transmission efficiency and leak prevention performance and also excellent in wear resistance and load bearing performance, while the grease composition satisfies both lubrication lifetime and lubrication performance.

The X, Y, and Z values can be calculated from a molar equivalent of each amine to be used as a raw material.

As the monovalent saturated chain hydrocarbon group, there is exemplified a linear or branched alkyl group having 6 to 24 carbon atoms. Specifically, examples thereof include a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, an octadecenyl group, a nonadecyl group, and an eicosyl group.

As the monovalent unsaturated chain hydrocarbon group, there is exemplified a linear or branched alkenyl group having 6 to 24 carbon atoms. Specifically, examples thereof include a hexenyl group, a heptenyl group, an octenyl group, a nonenyl group, a decenyl group, a dodecenyl group, a tridecenyl group, a tetradecenyl group, a pentadecenyl group, a hexadecenyl group, an octadecenyl group, a nonadecenyl group, an eicosenyl group, an oleyl group, a geranyl group, a farnesyl group, and a linoleyl group.

The monovalent saturated chain hydrocarbon group and the monovalent unsaturated chain hydrocarbon group each may be a linear chain or a branched chain.

Examples of the monovalent saturated alicyclic hydrocarbon group include a cycloalkyl group, such as a cyclohexyl group, a cycloheptyl group, a cyclooctyl group, and a cyclononyl group; and a cycloalkyl group substituted with an alkyl group having 1 to 6 carbon atoms (preferably a cyclohexyl group substituted with an alkyl group having 1 to 6 carbon atoms), such as a methylcyclohexyl group, a dimethylcyclohexyl group, an ethylcyclohexyl group, a diethylcyclohexyl group, a propylcyclohexyl group, an isopropylcyclohexyl group, a 1-methyl-propylcyclohexyl group, a butylcyclohexyl group, a pentylcyclohexyl group, a pentyl-methylcyclohexyl group, and a hexylcyclohexyl group.

Examples of the monovalent unsaturated alicyclic hydrocarbon group include a cycloalkenyl group, such as a cyclohexenyl group, a cycloheptenyl group, and a cyclooctenyl group; and a cycloalkenyl group substituted with an alkyl group having 1 to 6 carbon atoms (preferably a cyclohexenyl group substituted with an alkyl group having 1 to 6 carbon atoms), such as a methylcyclohexenyl group, a dimethylcyclohexenyl group, an ethylcyclohexenyl group, a diethylcyclohexenyl group, and a propylcyclohexenyl group.

Examples of the monovalent aromatic hydrocarbon group include a phenyl group, a biphenyl group, a terphenyl group, a naphthyl group, a diphenylmethyl group, a diphenylethyl group, a diphenylpropyl group, a methylphenyl group, a dimethylphenyl group, an ethylphenyl group, and a propylphenyl group.

Although the carbon number of the divalent aromatic hydrocarbon group which can be selected as $R^3$ in the general formula (b1) is 6 to 18, it is preferably 6 to 15, and more preferably 6 to 13.

Examples of the divalent aromatic hydrocarbon group which can be selected as $R^3$ include a phenylene group, a diphenylmethylene group, a diphenylethylene group, a diphenylpropylene group, a methylphenylene group, a dimethylphenylene group, and an ethylphenylene group.

Of these, a phenylene group, a diphenylmethylene group, a diphenylethylene group, or a diphenylpropylene group is preferred, and a diphenylmethylene group is more preferred.

In the grease composition of one embodiment of the present invention, the content of the component (B) is, based on the total amount (100% by mass) of the grease composition, preferably 1.0 to 15.0% by mass or less, more preferably 1.5 to 13.0% by mass or less, even more preferably 2.0 to 10.0% by mass or less, further more preferably 2.5 to 8.0% by mass, further more preferably 2.5 to 6.0% by mass.

When the content of the component (B) is 1.0% by mass or more, the worked penetration of the resultant grease composition can be readily controlled to fall within a suitable range. In addition, the grease composition can be readily made to have good leak prevention performance.

On the other hand, when the content of the component (B) is 15.0% by mass or less, the resultant grease composition can be controlled to be soft and can be readily made to have good lubricity, and therefore the torque transmission efficiency thereof can be readily improved.

<Method for Producing Urea-Based Thickener (B)>

The urea-based thickener (B) can be produced generally by reacting an isocyanate compound and a monoamine. The reaction is preferable according to a method of adding a solution (β) prepared by dissolving a monoamine in the base oil (A) to a hot solution (α) prepared by dissolving an isocyanate compound to the base oil (A).

For example, in the case where a compound represented by the general formula (b1) is produced, a diisocyanate having a group that corresponds to the divalent aromatic hydrocarbon group represented by $R^3$ in the general formula (b1) is used as an isocyanate compound and an amine having a group that corresponds to the monovalent hydrocarbon group represented by $R^1$ and $R^2$ is used as a monoamine, and according to the above-mentioned method, a desired urea-based thickener (B) is synthesized.

From the viewpoint of finely pulverizing particles of the urea-based thickener (B) in the grease composition so as to satisfy the requirement (I) and further the requirement (II), it is preferred to produce the grease composition containing the component (A) and the component (B), using a grease manufacturing apparatus as expressed in the following [1].

[1] A grease manufacturing apparatus including a container body having an introduction portion into which a grease raw material is introduced and a discharge portion for discharging the grease into the outside; and a rotor having a rotation axis in an axial direction of the inner periphery of the container body and rotatably provided in the inside of the container body, the rotor including a first concave-convex portion in which:

(i) concave and convex are alternately provided along the surface of the rotor, the concave and convex being inclined to the rotation axis, and (ii) a feeding ability from the introduction portion to a direction of the discharge portion is provided.

While the grease manufacturing apparatus as set forth in the above [1] is hereunder described, the term "preferred" prescribed below is an embodiment from the viewpoint of finely pulverizing the particles of the urea-based thickener (B) in the grease composition so as to satisfy the requirement (I) and further the requirement (II), unless otherwise specifically indicated.

FIG. 1 is a schematic cross-sectional view of the grease manufacturing apparatus as set forth in the above [1] that can be used in one embodiment of the present invention.

A grease manufacturing apparatus 1 shown in FIG. 1 includes a container body 2 for introducing a grease raw material into the inside thereof; and a rotor 3 having a rotation axis 12 on a central axis line of an inner periphery of the container body 2 and rotating around the rotation axis 12 as a center axis.

The rotor 3 rotates at high speed around the rotation axis 12 as a center axis to apply a high shearing force to a grease raw material inside the container body 2. Thus, the grease containing the urea-based thickener is produced.

As shown in FIG. 1, the container body 2 is preferably partitioned to an introduction portion 4, a retention portion 5, a first inner peripheral surface 6, a second inner peripheral surface 7, and a discharge portion 8 in this order from an upstream side.

As shown in FIG. 1, it is preferred that the container body 2 has an inner peripheral surface forming such a truncated cone shape that an inner diameter thereof gradually increases from the introduction portion 4 toward the discharge portion 8.

The introduction portion 4 serving as one end of the container body 2 is provided with a plurality of solution introducing pipes 4A and 4B for introducing a grease raw material from the outside of the container body 2.

The retention portion 5 is disposed in a downstream portion of the introduction portion 4, and is a space for temporarily retaining the grease raw material introduced from the introduction portion 4. When the grease raw material is retained in the retention portion 5 for a long time, grease adhered to the inner peripheral surface of the retention portion 5 forms a large lump, so that it is preferred to transport the grease raw material to the first inner peripheral surface 6 in the downstream side in a short time as far as possible. More preferably, it is preferred to transport the grease raw material directly to the first inner peripheral surface 6 without passing through the retention portion 5.

The first inner peripheral surface 6 is disposed in a downstream portion adjacent to the retention portion 5, and the second inner peripheral surface 7 is disposed in a downstream portion adjacent to the first inner peripheral surface 6. As mentioned later in detail, it is preferred to provide a first concave-convex portion 9 on the first inner peripheral surface 6 and to provide a second concave-convex portion 10 on the second inner peripheral surface 7, for the purpose of allowing the first inner peripheral surface 6 and the second inner peripheral surface 7 to function as a high shearing portion for imparting a high shearing force to the grease raw material or grease.

The discharge portion 8 serving as the other end of the container body 2 is a part for discharging the grease agitated on the first inner peripheral surface 6 and the second inner peripheral surface 7, and is provided with a discharge port 11 for discharging grease. The discharge port 11 is formed in a direction orthogonal or approximately orthogonal to the rotation axis 12. According to this, the grease is discharged from the discharge port 11 to the direction orthogonal or approximately orthogonal to the rotation axis 12. However, the discharge port 11 does not necessarily have to be made orthogonal to the rotation axis 12, and may be formed in a direction parallel or approximately parallel to the rotation axis 12.

The rotor 3 is rotatably provided on the center axis line of the inner peripheral surface of the container body 2, which has a truncated cone shape, as a rotation axis 12, and rotates counterclockwise when the container body 2 is viewed from the upstream portion to the downstream portion as shown in FIG. 1.

The rotor 3 has an outer peripheral surface that expands in accordance with the enlargement of the inner diameter of the truncated cone of the container body 2, and the outer peripheral surface of the rotor 3 and the inner peripheral surface of the truncated cone of the container body 2 are maintained at a constant interval.

On the outer peripheral surface of the rotor 3, a first concave-convex portion 13 of the rotor in which concave and convex are alternately provided along the surface of the rotor 3 is provided.

The first concave-convex portion 13 of the rotor is inclined to the rotation axis 12 of the rotor 3 in the direction of from the introduction portion 4 to the discharge portion 8, and has a feeding ability in the direction of from the introduction portion 4 to the discharge portion 8. That is, the first concave-convex portion 13 of the rotor is inclined in the direction in which the solution is pushed toward the downstream side when the rotor 3 rotates in the direction shown in FIG. 1.

A step difference between a concave portion 13A and a convex portion 13B of the first concave-convex portion 13 of the rotor is preferably 0.3 to 30, more preferably 0.5 to 15, and still more preferably 2 to 7, when the diameter of the concave portion 13A on the outer peripheral surface of the rotor 3 is 100.

The number of convex portions 13B of the first concave-convex portion 13 of the rotor in the circumferential direction is preferably 2 to 1,000, more preferably 6 to 500, and still more preferably 12 to 200.

A ratio of the width of the convex portion 13B to the width of the concave portion 13A of the first concave-convex portion 13 of the rotor [(width of the convex portion)/(width of the concave portion)] in the cross section orthogonal to the rotation axis 12 of the rotor 3 is preferably 0.01 to 100, more preferably 0.1 to 10, and still more preferably 0.5 to 2.

An inclination angle of the first concave-convex portion 13 of the rotor with respect to the rotation axis 12 is preferably 2 to 85°, more preferably 3 to 45°, and still more preferably 5 to 20°.

It is preferred that the first inner peripheral surface 6 of the container body 2 is provided with the first concave-convex portion 9 formed with a plurality of concave and convex along the inner peripheral surface thereof.

It is preferred that the concave and convex of the first concave-convex portion 9 on the side of the container body 2 are inclined in the opposite direction to the first concave-convex portion 13 of the rotor.

That is, it is preferred that the plurality of concave and convex of the first concave-convex portion 9 on the side of the container body 2 be inclined in the direction in which the solution is pushed toward the downstream side when the rotation axis 12 of the rotor 3 rotates in the direction shown in FIG. 1. The stirring ability and the discharge ability are further enhanced by the first concave-convex portion 9 having a plurality of concave and convex provided on the first inner peripheral surface 6 of the container body 2.

A depth of the concave and convex of the first concave-convex portion 9 on the side of the container body 2 is preferably 0.2 to 30, more preferably 0.5 to 15, and still more preferably 1 to 5, when the inner diameter (diameter) of the container is set to 100.

The number of concave and convex of the first concave-convex portion 9 on the side of the container body 2 is preferably 2 to 1,000, more preferably 6 to 500, and still more preferably 12 to 200.

A ratio of the width of the concave portion to the width of the convex portion between grooves in the concave and convex of the first concave-convex portion 9 on the side of the container body 2 [(width of the concave portion)/(width of the convex portion)] is preferably 0.01 to 100, more preferably 0.1 to 10, and still more preferably 0.5 to 2 or less.

An inclination angle of the concave and convex of the first concave-convex portion 9 on the side of the container body 2 to the rotation axis 12 is preferably 2 to 85°, more preferably 3 to 45°, and still more preferably 5 to 20°.

By providing the first concave-convex portion 9 on the first inner peripheral surface 6 of the container body 2, the first inner peripheral surface 6 can be made to function as a shearing portion for imparting a high shearing force to the grease raw material or grease, but the first concave-convex portion 9 does not necessarily have to be provided.

It is preferred that a second concave-convex portion 14 of a rotor having concave and convex alternately provided along the surface of the rotor 3 is provided on the outer peripheral surface of the downstream portion of the first concave-convex portion 13 of the rotor.

The second concave-convex portion 14 of the rotor is inclined to the rotation axis 12 of the rotor 3, and has a feeding suppression ability to push the solution back toward the upstream side from the introduction portion 4 toward the discharge portion 8.

A step difference of the second concave-convex portion 14 of the rotor is preferably 0.3 to 30, more preferably 0.5 to 15, and still more preferably 2 to 7, when the diameter of the concave portion of the outer peripheral surface of the rotor 3 is set to 100.

The number of convex portions of the second concave-convex portion 14 of the rotor in the circumferential direction is preferably 2 to 1,000, more preferably 6 to 500, and still more preferably 12 to 200.

A ratio of the width of the convex portion to the width of the concave portion of the second concave-convex portion 14 of the rotor in a cross section orthogonal to the rotation axis of the rotor 3 [(width of the convex portion)/(width of the concave portion)] is preferably 0.01 to 100, more preferably 0.1 to 10, and still more preferably 0.5 to 2.

An inclination angle of the second concave-convex portion 14 of the rotor to the rotation axis 12 is preferably 2 to 85°, more preferably 3 to 45°, and still more preferably 5 to 20°.

It is preferred that the second inner peripheral surface 7 of the container body 2 is provided with the second concave-convex portion 10 formed with a plurality of concave and convex adjacent to the downstream portion of the concave and convex in the first concave-convex portion 9 on the side of the container body 2.

It is preferred that the plurality of concave and convex are formed on the inner peripheral surface of the container body 2, and that the concave and convex are inclined in opposite directions to the inclination direction of the second concave-convex portion 14 of the rotor.

Figure 2:
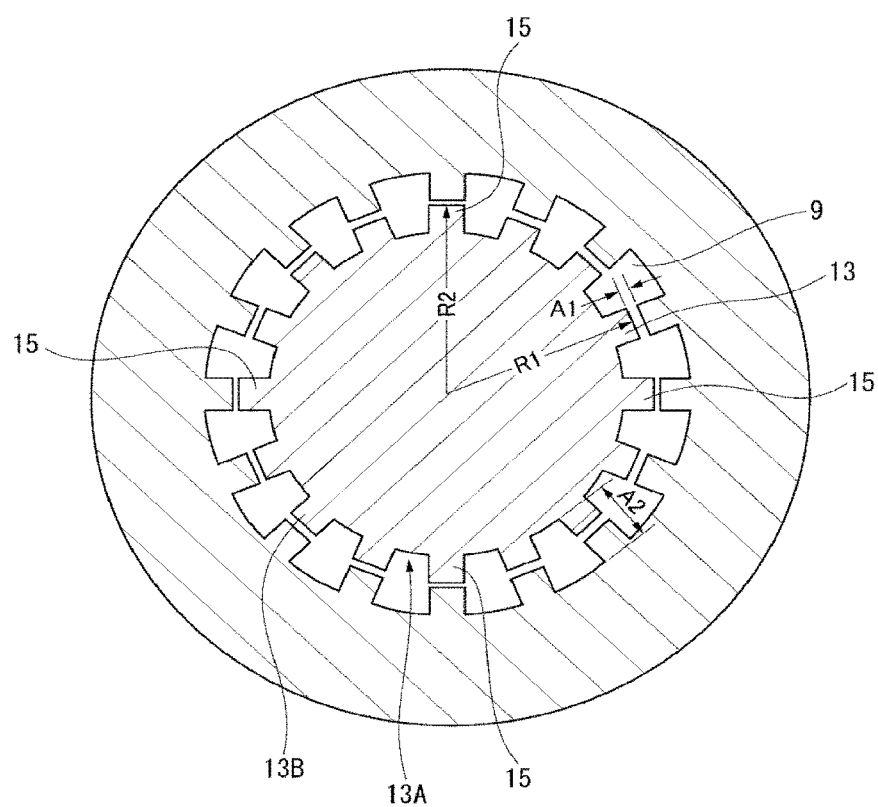
FIG. 2 is a schematic view of a cross section in the direction orthogonal to a rotation axis in a first concave-convex portion on the side of a container body of the grease manufacturing apparatus of FIG. 1.

That is, it is preferred that the plurality of concave and convex of the second concave-convex portion 10 on the side of the container body 2 are inclined in the direction in which the solution is pushed back toward the upstream side when the rotation axis 12 of the rotor 3 rotates in the direction shown in FIG. 2. A stirring ability is more enhanced by the concave and convex of the second concave-convex portion 10 provided on the second inner peripheral surface 7 of the container body 2. In addition, the second inner peripheral surface 7 of the container body can function as a shearing portion which imparts a high shearing force to the grease raw material or grease.

A depth of the concave portion of the second concave-convex portion 10 on the side of the container body 2 is preferably 0.2 to 30, more preferably 0.5 to 15, and still more preferably 1 to 5, when the inner diameter (diameter) of the container body 2 is set to 100.

The number of concave portions of the second concave-convex portion 10 on the side of the container body 2 is preferably 2 to 1,000, more preferably 6 to 500, and still more preferably 12 to 200.

A ratio of the width of the convex portion of the concave and convex of the second concave-convex portion 10 on the side of the container body 2 to the width of the concave portion in the cross section orthogonal to the rotation axis 12 of the rotor 3 [(width of the convex portion)/(width of the concave portion)] is preferably 0.01 to 100, more preferably 0.1 to 10, and still more preferably 0.5 to 2 or less.

An inclination angle of the second concave-convex portion 10 on the side of the container body 2 to the rotation axis 12 is preferably 2 to 85°, more preferably 3 to 45°, and still more preferably 5 to 20°.

A ratio of the length of the first concave-convex portion 9 on the side of the container body 2 to the length of the second concave-convex portion 10 on the side of the container body 2 [(length of the first concave-convex portion)/(length of the second concave-convex portion)] is preferably 2/1 to 20/1.

FIG. 2 is a cross-sectional view of the direction orthogonal to the rotation axis 12 in the first concave-convex portion 9 on the side of the container body 2 of the grease manufacturing apparatus 1.

In the first concave-convex portion 13 of the rotor shown in FIG. 2, a plurality of scrapers 15 each having a tip protruding toward the inner peripheral surface side of the container body 2 beyond the tip in the projecting direction of the convex portion 13B of the first concave-convex portion 13 are provided. In addition, though not shown, the second concave-convex portion 14 is also provided with a plurality of scrapers in which the tip of the convex portion protrudes toward the inner peripheral surface side of the container body 2, similarly to the first concave-convex portion 13.

The scraper 15 scrapes off the grease adhered to the inner peripheral surface of the first concave-convex portion 9 on the side of the container body 2 and the second concave-convex portion 10 on the side of the container body 2.

With respect to the protrusion amount of the tip of the scraper 15 relative to the projecting amount of the convex portion 13B of the first concave-convex portion 13 of the rotor, a ratio [R2/R1] of the radius (R2) of the tip of the scraper 15 to the radius (R1) of the tip of the convex portion 13B is preferably more than 1.005 and less than 2.0.

The number of scrapers 15 is preferably 2 to 500, more preferably 2 to 50, and still more preferably 2 to 10.

In the grease manufacturing apparatus 1 shown in FIG. 2, the scraper 15 is provided, but may not be provided, or may be provided intermittently.

In order to produce the grease containing the urea-based thickener (B) by the grease manufacturing apparatus 1, the solution (α) and the solution (β) which are the aforementioned grease raw materials are introduced respectively from the solution introducing pipes 4A and 4B of the introduction portion 4 of the container body 2, and the rotor 3 is rotated at a high speed, whereby the grease base material containing the urea-based thickener (B) can be produced.

Then, even by blending the extreme-pressure agent (C) and the other additive (D) with the thus-prepared grease base material, the urea-based thickener (B) in the grease composition can be finely pulverized so as to satisfy the requirement (I and further the requirement (II).

As a high-speed rotation condition of the rotor 3, a shear rate applied to the grease raw material is preferably $10^2$ s$^{-1}$ or more, more preferably $10^3$ s$^{-1}$ or more, and still more preferably $10^4$ s$^{-1}$ or more, and it is typically $10^7$ s$^{-1}$ or less.

A ratio of a maximum shear rate (Max) to a minimum shear rate (Min) in the shearing at the time of high-speed rotation of the rotor 3 (Max/Min) is preferably 100 or less, more preferably 50 or less, and still more preferably 10 or less.

The shear rate to the mixed solution is as uniform as possible, thereby the urea-based thickener and a precursor thereof in the grease composition can be more readily pulverized into fine particles, and a more uniform grease structure can be thus obtained.

Here, the maximum shear rate (Max) is a highest shear rate applied to the mixed solution, and the minimum shear rate (Min) is a lowest shear rate applied to the mixed solution, which are defined as follows.

> Maximum shear rate (Max)=(linear velocity at the tip of the convex portion 13B of the first concave-convex portion 13 of the rotor)/(gap A1 between the tip of the convex portion 13B of the first concave-convex portion 13 of the rotor and the convex portion of the first concave-convex portion 9 of the first inner peripheral surface 6 of the container body 2)

> Minimum shear rate (Min)=(linear velocity of the concave portion 13A of the first concave-convex portion 13 of the rotor)/(gap A2 between the concave portion 13A of the first concave-convex portion 13 of the rotor and the concave portion of the first concave-convex portion 9 on the first inner peripheral surface 6 of the container body 2)

The gap A1 and the gap A2 are as shown in FIG. 2.

The grease manufacturing apparatus 1 is provided with the scraper 15, thereby grease adhered to the inner peripheral surface of the container body 2 can be scraped off, so that the generation of the lumps during kneading can be prevented, and the grease in which the urea-based thickener is finely dispersed can be continuously produced in a short time.

In view of the fact that the scraper 15 scrapes off the grease adhered thereto, it is possible to prevent the retained grease from becoming a resistance to rotation of the rotor 3, so that the rotational torque of the rotor 3 can be reduced, and the power consumption of the drive source can be reduced, thereby making it possible to continuously produce the grease efficiently.

Since the inner peripheral surface of the container body 2 is in a shape of a truncated cone whose inner diameter increases from the introduction portion 4 toward the discharge portion 8, the centrifugal force has an effect for discharging the grease or grease raw material in the downstream direction, and the rotation torque of the rotor 3 can be reduced to continuously produce the grease.

Since the first concave-convex portion 13 of the rotor is provided on an outer peripheral surface of the rotor 3, the first concave-convex portion 13 of the rotor is inclined to the rotation axis 12 of the rotor 3, the first concave-convex portion 13 has a feeding ability from the introduction portion 4 to the discharge portion 8, the second concave-convex portion 14 of the rotor is inclined to the rotation axis 12 of the rotor 3, and the second concave-convex portion 14 has a feeding suppression ability from the introduction portion 4 to the discharge portion 8, a high shear force can be given to the solution, and even after blending with the additive, the urea-based thickener (B) in the grease composition can be finely pulverized so as to satisfy the requirement (I) and further the requirement (II).

Since the first concave-convex portion 9 is formed on the first inner peripheral surface 6 of the container body 2 and is inclined in the opposite direction to the first concave-convex portion 13 of the rotor, in addition to the effect of the first concave-convex portion 13 of the rotor, sufficient stirring of grease raw material can be carried out while extruding the grease or grease raw material in the downstream direction. Consequently, even after blending with the additive, the urea-based thickener (B) in the grease composition can be finely pulverized so as to satisfy the requirement (I) and further the requirement (II).

The second concave-convex portion 10 is provided on the second inner peripheral surface 7 of the container body 2, and the second concave-convex portion 14 of the rotor is provided on the outer peripheral surface of the rotor 3, thereby the grease raw material can be prevented from flowing out from the first inner peripheral surface 6 of the container body more than necessary. Consequently, even after blending with the additive by giving a high shear force to the solution to highly disperse the grease raw material, the urea-based thickener (B) can also be finely pulverized so as to satisfy the requirement (I) and further the requirement (II).

<Extreme-Pressure Agent (C)>

Preferably, the grease composition of one embodiment of the present invention further contains an extreme-pressure agent (C) along with the components (A) and (B).

In general, even when added an extreme-pressure agent (C) thereto, a grease composition containing the urea-based thickener could hardly exhibit the performance of the extreme-pressure agent (C), and the grease composition could hardly be given wear resistance and load bearing performance by the extreme-pressure agent (C). However, as a result of assiduous studies, the present inventor has surprisingly found that, the grease composition satisfying the requirement (I) and further the requirement (II) can extremely readily exhibit the performance of the extreme-pressure agent (C) and can be a grease composition excellent in wear resistance and load bearing performance.

The extreme-pressure agent (C) to be used in the grease composition of one embodiment of the present invention is one or more selected from an organic metal-based extreme pressure agent, a sulfur-based extreme pressure agent, a phosphorus-based extreme pressure agent, and a sulfur-phosphorus-based extreme pressure agent.

Among these, from the viewpoint of improving wear resistance and load bearing performance, one or more selected from an organic metal-based extreme-pressure agent, or a combination of a sulfur-based extreme pressure agent, a phosphorus-based extreme-pressure agent and a sulfur-phosphorus-based extreme pressure agent is preferred, and one or more selected from an organic metal-based extreme-pressure agent are more preferred.

Hereinunder the organic metal-based extreme pressure agent, the sulfur-based extreme-pressure agent, the phosphorus-based extreme-pressure agent, and the sulfur-phosphorus-based extreme pressure agent are described.

(Organic Metal-Based Extreme-Pressure Agent)

As the organic metal-based extreme-pressure agent, for example, usable are one or more selected from an organic molybdenum compound such as a molybdenum dialkyldithiocarbamate (MoDTC) and a molybdenum dialkyldithiophosphate (MoDTP); and an organic zinc compound such as a zinc dialkyldithiocarbamate (ZnDTC) and a zinc dialkyldithiophosphate (ZnDTP).

Among these, from the viewpoint of further improving wear resistance and load bearing performance, any of a molybdenum dialkyldithiocarbamate (MoDTC) and a zinc dialkyldithiophosphate (ZnDTP) is preferably used, and more preferably, these are combined and used.

In the case where a molybdenum dialkyldithiocarbamate (MoDTC) and a zinc dialkyldithiophosphate (ZnDTP) are combined and used, the content ratio of the molybdenum dialkyldithiocarbamate (MoDTC) to the zinc dialkyldithiophosphate (ZnDTP) [(MoDTC)/(ZnDTP)] is, by mass, preferably 1/10 to 10/1, more preferably 1/5 to 5/1, even more preferably 1/3 to 3/1.

(Sulfur-Based Extreme-Pressure Agent)

As the sulfur-based extreme-pressure agent, for example, usable are one or more selected from sulfurized oils and fats, sulfurized fatty acids, sulfurized esters, sulfurized olefins, monosulfides, polysulfides, dihydrocarbyl polysulfides, thiadiazole compounds, alkylthiocarbamoyl compounds, thiocarbamate compounds, thioterpene compounds, and dialkylthio dipropionate compounds.

Among these, from the viewpoint of further improving wear resistance and load bearing performance, any of sulfurized oils and fats and thiocarbamate compounds is preferably used, and more preferably, a combination of these is used.

(Phosphorus-Based Extreme-Pressure Agent)

As the phosphorus-based extreme pressure agent, for example, usable are one or more selected from phosphates such as aryl phosphates, alkyl phosphates, alkenyl phosphates, and alkylaryl phosphates; acid phosphates such as monoaryl acid phosphates, diaryl acid phosphates, monoalkyl acid phosphates, dialkyl acid phosphates, monoalkenyl acid phosphates, and dialkenyl acid phosphates; phosphites such as arylhydrogen phosphites, alkylhydrogen phosphites, aryl phosphites, alkyl phosphites, alkenyl phosphites, and arylalkyl phosphites; acid phosphites such as monoalkyl acid phosphites, dialkyl acid phosphites, monoalkenyl acid phosphites, and dialkenyl acid phosphites; and amine salts thereof.

Among these, from the viewpoint of further improving wear resistance and load bearing performance, amine salts of acid phosphites are preferably used.

(Sulfur-Phosphorus-Based Extreme-Pressure Agent)

As the sulfur-phosphorus-based extreme-pressure agent, for example, usable are one or more selected from monoalkyl thiophosphates, dialkyl dithiophosphates, trialkyl trithiophosphates, and amine salts thereof, as well as zinc dialkyldithiophosphates (Zn-DTP).

From the viewpoint of further improving wear resistance and load bearing performance, monoalkyl thiophosphates are preferably used.

(Embodiment of Combination of Sulfur-Based Extreme-Pressure Agent and Sulfur-Phosphorus-Based Extreme Pressure Agent)

Embodiments of a sulfur-based extreme-pressure agent and a sulfur-phosphorus-based extreme pressure agent include a combination of the above-exemplified compounds, and from the viewpoint of further improving wear resistance and load bearing performance, a combination of sulfurized oils and fats, thiocarbamate compounds, acid phosphate amine salts and monoalkyl thiophosphates is preferred.

Preferably, the sulfur-based extreme-pressure agent and the sulfur-phosphorus-based extreme-pressure agent are metal-free compounds.

The content of the extreme-pressure agent (C) in the grease composition of one embodiment of the present invention is, based on the total amount (100% by mass) of the grease composition, preferably 0.1 to 10% by mass, more preferably 0.5 to 8.0% by mass, even more preferably 1.0 to 6.0% by mass.

<Additive (D)>

The grease composition of one embodiment of the present invention may contain any other additive (D) than the component (B) and the component (C) that may be blended in ordinary grease, within a range not detracting from the advantageous effects of the present invention.

Examples of the additive (D) include an antioxidant, a rust inhibitor, a dispersant, and a metal deactivator.

One alone or two or more kinds of the above may be used as the additive (D).

Examples of the antioxidant include amine-based antioxidants such as diphenylamine compounds and naphthylamine compounds; and phenol-based antioxidants such as monocyclic phenol compounds and polycyclic phenol compounds.

Examples of the rust inhibitor include carboxylic acid-based rust inhibitors such as alkenylsuccinic acid polyalcohol esters, as well as zinc stearate, thiadiazole and derivatives thereof, and benzotriazole and derivatives thereof.

Examples of the dispersant include ash-free dispersants such as succinimides, and boron-based succinimides.

Examples of the metal deactivator include benzotriazole compounds.

In the grease composition of one embodiment of the present invention, the content of the additive (D) is, each independently based on the total amount (100% by mass) of the grease composition, generally 0.01 to 20% by mass, preferably 0.01 to 15% by mass, more preferably 0.01 to 10% by mass, further more preferably 0.01 to 7% by mass.

<Blending Method with Extreme-Pressure Agent (C) and Additive (D)>

The grease composition of the present invention can be produced by mixing a grease containing the base (A) and the urea-based thickener (B), as prepared according to the above-mentioned method, optionally with one or more selected from the extreme-pressure agent (C) and the additive (D).

For example, the grease composition can be produced by blending one or more selected from the extreme-pressure agent (C) and the additive (D) with the grease and then stirring the resultant blend, or by blending one or more selected from the extreme-pressure agent (C) and the additive (D) with the grease with stirring.

<Physical Properties of Grease Composition of the Invention>

(Worked Penetration at 25° C.)

A worked penetration at 25° C. of the grease composition of one embodiment of the present invention is preferably 240 to 450, more preferably 260 to 450, even more preferably 300 to 450, further more preferably 340 to 450, further more preferably 380 to 450.

Even when the worked penetration at 25° C. of the grease composition of one embodiment of the present invention is controlled to fall within the above range, the leak prevention performance of the grease composition can be excellent, and the grease composition can be excellent in torque transmission efficiency and leak prevention performance.

In the present specification, the worked penetration of the grease composition means a value measured at 25° C. according to the method D 217 of ASTM.

(Torque Transmission Efficiency)

The torque transmission efficiency of the grease composition of one embodiment of the present invention, as measured and calculated according to the method described in the section of Examples given hereinunder, is preferably 50% or more, more preferably 60% or more, even more preferably 70% or more, further more preferably 80% or more.

(Leak Prevention Performance)

The grease leak rate of the grease composition of one embodiment of the present invention, as measured and calculated according to the method described in the section of Examples given hereinunder, is preferably less than 5.0%, more preferably 2.0% or less, even more preferably 1.0% or less, further more preferably 0.5% or less, further more preferably 0%.

(Wear Resistance)

The wear resistance (fretting wear resistance) of the grease composition of one embodiment of the present invention, as measured according to the method described in the section of Examples given hereinunder and in conformity to the method D 4170 of ASTM, is preferably 15 mg or less, more preferably 10 mg or less, even more preferably 8 mg or less, further more preferably 7 mg or less.

(Load Bearing Performance)

The load bearing performance (weld load: WL) of the grease composition of one embodiment of the present invention, as measured and calculated according to the method described in the section of Examples given hereinunder and in conformity to the method D 2596 of ASTM, is preferably 981 N or more, more preferably 1236 N or more, even more preferably 1569 N or more, further more preferably 1961 N or more, further more preferably 2452 N or more, further more preferably 3089 N or more.

<Use of Grease Composition of the Invention>

The grease composition of the present invention is excellent in both torque transmission efficiency and leak prevention performance and is also excellent in wear resistance and load bearing performance.

Accordingly, the grease composition of one embodiment of the present invention is favorably used in speed reducers equipped in industrial robots and also for speed increasers equipped in wind power facilities.

Examples of the speed reducer and the speed increaser include a speed reducer having a gear mechanism, and a speed increaser having a gear mechanism. However, the application target of the grease composition of one embodiment of the present invention is not limited to a speed reducer having a gear mechanism and a speed increaser having a gear mechanism, and the grease composition is also applicable to, for example, traction drives.

According to one embodiment of the present invention, there can be provided a speed reducer or a speed increaser having the grease composition of the present invention in a lubrication part.

Further, according to one embodiment of the present invention, there can be provided a lubrication method for lubricating a lubrication part in a speed reducer or a speed increase with the grease composition of the present invention.

EXAMPLES

The present invention is hereunder described more specifically with reference to Examples, but it should be construed that the present invention is by no means limited by these Examples.

[Various Physical Properties]

The measurement methods for various physical properties are as follows.

(1) Kinematic Viscosity at 40° C., Kinematic Viscosity at 100° C., and Viscosity Index The measurement and calculation were performed in conformity with JIS K2283:2000.

(2) Worked Penetration

The measurement was performed at 25° C. in conformity with the method D 217 in ASTM.

[Raw Materials]

The base oil (A), the extreme-pressure agent (C) and the additive (D) used as raw materials for preparing the grease compositions in Examples 1 to 9 and Comparative Examples 1 to 6 are as follows.

(1) Base Oil (A)

Base Oil (A1): paraffinic mineral oil having a kinematic viscosity at 40° C. of 50 mm$^2$/s.

Base Oil (A2): paraffinic mineral oil having a kinematic viscosity at 40° C. of 100 mm$^2$/s.

Base Oil (A3): poly-α-olefin (PAO) having a kinematic viscosity at 40° C. of 50 mm$^2$/s.

Base Oil (A4): poly-α-olefin (PAO) having a kinematic viscosity at 40° C. of 100 mm$^2$/s.

(2) Extreme-Pressure Agent (C)

Extreme-Pressure Agent (C1): phosphorus-based extreme-pressure agent 1 (acid phosphate amine salt)

Extreme-Pressure Agent (C2): sulfur-based extreme-pressure agent 1 (dithiocarbamate compound)

Extreme-Pressure Agent (C3): sulfur-phosphorus-based extreme-pressure agent 1 (monoalkyl thiophosphate)

Extreme-Pressure Agent (C4): sulfur-based extreme-pressure agent 2 (sulfurized oils and fats)

Extreme-Pressure Agent (C5): organic metal-based extreme-pressure agent 1 (zinc dithiophosphate)

Extreme-Pressure Agent (C6): organic metal-based extreme-pressure agent 1 (molybdenum dithiocarbamate)

(3) Additive (D)

Additive (D1): rust inhibitor (Zn stearate)

Additive (D2): antioxidant (monobutylphenyl monooctylphenylamine)

Additive (D3): copper deactivator (Na sulfonate)

Example 1

(1) Synthesis of Urea Grease (x-1)

4.71 parts by mass of diphenylmethane-4,4'-diisocyanate (MDI) was added to 41.39 parts by mass of the base oil (A1) to prepare a solution (α).

5.91 parts by mass of octadecylamine and 1.45 parts by mass of cyclohexylamine were added to 38.74 parts by mass of the base oil (A1) that had been separately prepared, to prepare a solution (β).

Using the grease manufacturing apparatus 1 shown in FIG. 1, the solution (α) which had been heated at 70° C. was introduced at a flow rate of 150 L/h from the solution introducing pipe 4A into the container body 2, and the solution (β) which had been heated at 70° C. was simultaneously introduced at a flow rate of 150 L/h from the solution introducing pipe 4B into the container body 2, and the solution (α) and the solution (β) were kept continuously introduced into the container body 2 in a state of rotating the rotor 3 to synthesize a urea grease (x-1).

The rotation number of the rotator 3 of the grease manufacturing apparatus 1 used was 8000 rpm. On that occasion, a maximum shear rate (Max) was 10,500 s$^{-1}$, and stirring was performed by setting a ratio of a maximum shear rate (Max) to a minimum shear rate (Min) [Max/Min] to 3.5.

The urea-based thickener contained in the urea grease (x-1) corresponds to a compound of the general formula (b1) where $R^1$ and $R^2$ are selected from an octadecyl group and a cyclohexyl group, and $R^3$ is a diphenylmethylene group.

The molar ratio of octadecylamine to cyclohexylamine used as the raw materials (octadecylamine/cyclohexylamine) is 60/40.

(2) Preparation of Grease Composition (X1)

In the above (1), the urea grease (x-1) discharged out from the grease manufacturing apparatus 1 shown in FIG. 1 was stirred, then spontaneously left cooled, and the extreme-pressure agent (C5), the extreme-pressure agent (C6), the additive (D1), the additive (D2), and the additive (D3) were added thereto each in the blending amount shown in Table 1 to prepare a grease composition (X1).

Example 2

(1) Synthesis of Urea Grease (x-2)

3.88 parts by mass of diphenylmethane-4,4'-diisocyanate (MDI) was added to 42.22 parts by mass of the base oil (A1) to prepare a solution (α).

8.10 parts by mass of octadecylamine was added to 38.00 parts by mass of the base oil (A1) that had been separately prepared, to prepare a solution (β).

Using the grease manufacturing apparatus 1 shown in FIG. 1, a urea grease (x-2) was synthesized under the same condition as in (1) in Example 1.

The urea-based thickener contained in the urea grease (x-2) corresponds to a compound of the general formula (b1) where $R^1$ and $R^2$ are octadecyl groups, and $R^3$ is a diphenylmethylene group.

The molar ratio of octadecylamine to cyclohexylamine used as the raw materials (octadecylamine/cyclohexylamine) is 100/0.

(2) Preparation of Grease Composition (X2)

In the above (1), the urea grease (x-2) discharged out from the grease manufacturing apparatus 1 shown in FIG. 1 was stirred, then spontaneously left cooled, and the extreme-pressure agent (C5), the extreme-pressure agent (C6), the additive (D1), the additive (D2), and the additive (D3) were added thereto each in the blending amount shown in Table 1 to prepare a grease composition (X2).

Example 3

(1) Synthesis of Urea Grease (x-3)

5.49 parts by mass of diphenylmethane-4,4'-diisocyanate (MDI) was added to 40.61 parts by mass of the base oil (A1) to prepare a solution (α).

5.50 parts by mass of octylamine was added to 40.60 parts by mass of the base oil (A1) that had been separately prepared, to prepare a solution (β).

Using the grease manufacturing apparatus 1 shown in FIG. 1, a urea grease (x-3) was synthesized under the same condition as in (1) in Example 1.

The urea-based thickener contained in the urea grease (x-3) corresponds to a compound of the general formula (b1) where $R^1$ and $R^2$ are octyl groups, and $R^3$ is a diphenylmethylene group.

The molar ratio of octylamine to cyclohexylamine used as the raw materials (octylamine/cyclohexylamine) is 100/0.

(2) Preparation of Grease Composition (X3)

In the above (1), the urea grease (x-3) discharged out from the grease manufacturing apparatus 1 shown in FIG. 1 was stirred, then spontaneously left cooled, and the extreme-pressure agent (C5), the extreme-pressure agent (C6), the additive (D1), the additive (D2), and the additive (D3) were added thereto each in the blending amount shown in Table 1 to prepare a grease composition (X3).

Example 4

(1) Synthesis of Urea Grease (x-4)

1.95 parts by mass of diphenylmethane-4,4'-diisocyanate (MDI) was added to 44.25 parts by mass of the base oil (A1) to prepare a solution (a).

2.45 parts by mass of octadecylamine and 0.60 parts by mass of cyclohexylamine were added to 43.15 parts by mass of the base oil (A1) that had been separately prepared, to prepare a solution (β).

Using the grease manufacturing apparatus 1 shown in FIG. 1, a urea grease (x-4) was synthesized under the same condition as in (1) in Example 1.

The urea-based thickener contained in the urea grease (x-4) corresponds to a compound of the general formula (b1) where $R^1$ and $R^2$ are selected from an octadecyl group and a cyclohexyl group, and $R^3$ is a diphenylmethylene group.

The molar ratio of octadecylamine to cyclohexylamine used as the raw materials (octadecylamine/cyclohexylamine) is 60/40.

(2) Preparation of Grease Composition (X4)

In the above (1), the urea grease (x-4) discharged out from the grease manufacturing apparatus 1 shown in FIG. 1 was stirred, then spontaneously left cooled, and the extreme-pressure agent (C1), the extreme-pressure agent (C3), the extreme-pressure agent (C4), the additive (D1), the additive (D2), and the additive (D3) were added thereto each in the blending amount shown in Table 1 to prepare a grease composition (X4).

Example 5

(1) Synthesis of Urea Grease (x-5)

1.76 parts by mass of diphenylmethane-4,4'-diisocyanate (MDI) was added to 44.34 parts by mass of the base oil (A3) to prepare a solution (α).

2.20 parts by mass of octadecylamine and 0.54 parts by mass of cyclohexylamine were added to 43.36 parts by mass of the base oil (A3) that had been separately prepared, to prepare a solution (β).

Using the grease manufacturing apparatus 1 shown in FIG. 1, a urea grease (x-5) was synthesized under the same condition as in (1) in Example 1.

The urea-based thickener contained in the urea grease (x-5) corresponds to a compound of the general formula (b1) where $R^1$ and $R^2$ are selected from an octadecyl group and a cyclohexyl group, and $R^3$ is a diphenylmethylene group.

The molar ratio of octadecylamine to cyclohexylamine used as the raw materials (octadecylamine/cyclohexylamine) is 60/40.

(2) Preparation of Grease Composition (X5)

In the above (1), the urea grease (x-5) discharged out from the grease manufacturing apparatus 1 shown in FIG. 1 was stirred, then spontaneously left cooled, and the extreme-pressure agent (C5), the extreme-pressure agent (C6), the additive (D1), the additive (D2), and the additive (D3) were added thereto each in the blending amount shown in Table 1 to prepare a grease composition (X5).

Example 6

(1) Synthesis of Urea Grease (x-6)

1.20 parts by mass of diphenylmethane-4,4'-diisocyanate (MDI) was added to 44.90 parts by mass of the base oil (A2) to prepare a solution (α).

1.51 parts by mass of octadecylamine and 0.37 parts by mass of cyclohexylamine were added to 44.22 parts by mass of the base oil (A2) that had been separately prepared, to prepare a solution (β).

Using the grease manufacturing apparatus 1 shown in FIG. 1, a urea grease (x-6) was synthesized under the same condition as in (1) in Example 1.

The urea-based thickener contained in the urea grease (x-6) corresponds to a compound of the general formula (b1) where $R^1$ and $R^2$ are selected from an octadecyl group and a cyclohexyl group, and $R^3$ is a diphenylmethylene group.

The molar ratio of octadecylamine to cyclohexylamine used as the raw materials (octadecylamine/cyclohexylamine) is 60/40.

(2) Preparation of Grease Composition (X6)

In the above (1), the urea grease (x-6) discharged out from the grease manufacturing apparatus 1 shown in FIG. 1 was stirred, then spontaneously left cooled, and the extreme-pressure agent (C5), the extreme-pressure agent (C6), the additive (D1), the additive (D2), and the additive (D3) were added thereto each in the blending amount shown in Table 1 to prepare a grease composition (X6).

Example 7

(1) Synthesis of Urea Grease (x-7)

1.20 parts by mass of diphenylmethane-4,4'-diisocyanate (MDI) was added to 45.00 parts by mass of the base oil (A2) to prepare a solution (α).

1.51 parts by mass of octadecylamine and 0.37 parts by mass of cyclohexylamine were added to 44.32 parts by mass of the base oil (A2) that had been separately prepared, to prepare a solution (β).

Using the grease manufacturing apparatus 1 shown in FIG. 1, a urea grease (x-7) was synthesized under the same condition as in (1) in Example 1.

The urea-based thickener contained in the urea grease (x-7) corresponds to a compound of the general formula (b1) where $R^1$ and $R^2$ are selected from an octadecyl group and a cyclohexyl group, and W is a diphenylmethylene group.

The molar ratio of octadecylamine to cyclohexylamine used as the raw materials (octadecylamine/cyclohexylamine) is 60/40.

(2) Preparation of Grease Composition (X7)

In the above (1), the urea grease (x-7) discharged out from the grease manufacturing apparatus 1 shown in FIG. 1 was stirred, then spontaneously left cooled, and the extreme-pressure agent (C1), the extreme-pressure agent (C2), the extreme-pressure agent (C3), the extreme-pressure agent (C4), the additive (D1), the additive (D2), and the additive (D3) were added thereto each in the blending amount shown in Table 1 to prepare a grease composition (X7).

Example 8

(1) Synthesis of Urea Grease (x-8)

1.95 parts by mass of diphenylmethane-4,4'-diisocyanate (MDI) was added to 44.15 parts by mass of the base oil (A1) to prepare a solution (α).

2.45 parts by mass of octadecylamine and 0.60 parts by mass of cyclohexylamine were added to 43.05 parts by mass of the base oil (A1) that had been separately prepared, to prepare a solution (β).

Using the grease manufacturing apparatus 1 shown in FIG. 1, a urea grease (x-8) was synthesized under the same condition as in (1) in Example 1.

The urea-based thickener contained in the urea grease (x-8) corresponds to a compound of the general formula (b1) where $R^1$ and $R^2$ are selected from an octadecyl group and a cyclohexyl group, and $R^3$ is a diphenylmethylene group.

The molar ratio of octadecylamine to cyclohexylamine used as the raw materials (octadecylamine/cyclohexylamine) is 60/40.

(2) Preparation of Grease Composition (X8)

In the above (1), the urea grease (x-8) discharged out from the grease manufacturing apparatus 1 shown in FIG. 1 was stirred, then spontaneously left cooled, and the extreme-pressure agent (C5), the extreme-pressure agent (C6), the additive (D1), the additive (D2), and the additive (D3) were added thereto each in the blending amount shown in Table 1 to prepare a grease composition (X8).

Example 9

(1) Synthesis of Urea Grease (x-9)

1.95 parts by mass of diphenylmethane-4,4'-diisocyanate (MDI) was added to 46.40 parts by mass of the base oil (A1) to prepare a solution (α).

2.45 parts by mass of octadecylamine and 0.60 parts by mass of cyclohexylamine were added to 45.30 parts by mass of the base oil (A1) that had been separately prepared, to prepare a solution (β).

Using the grease manufacturing apparatus 1 shown in FIG. 1, a urea grease (x-9) was synthesized under the same condition as in (1) in Example 1.

The urea-based thickener contained in the urea grease (x-9) corresponds to a compound of the general formula (b1) where $R^1$ and $R^2$ are selected from an octadecyl group and a cyclohexyl group, and $R^3$ is a diphenylmethylene group.

The molar ratio of octadecylamine to cyclohexylamine used as the raw materials (octadecylamine/cyclohexylamine) is 60/40.

(2) Preparation of Grease Composition (X9)

In the above (1), the urea grease (x-9) discharged out from the grease manufacturing apparatus 1 shown in FIG. 1 was stirred, then spontaneously left cooled, and the additive (D1), the additive (D2), and the additive (D3) were added thereto each in the blending amount shown in Table 1 to prepare a grease composition (X9).

Comparative Example 1

(1) Synthesis of Urea Grease (y-1)

5.85 parts by mass of diphenylmethane-4,4'-diisocyanate (MDI) was added to 40.25 parts by mass of the base oil (A1) to prepare a solution (α).

7.34 parts by mass of octadecylamine and 1.80 parts by mass of cyclohexylamine were added to 36.96 parts by mass of the base oil (A1) that had been separately prepared, to prepare a solution (β).

Figure 3:
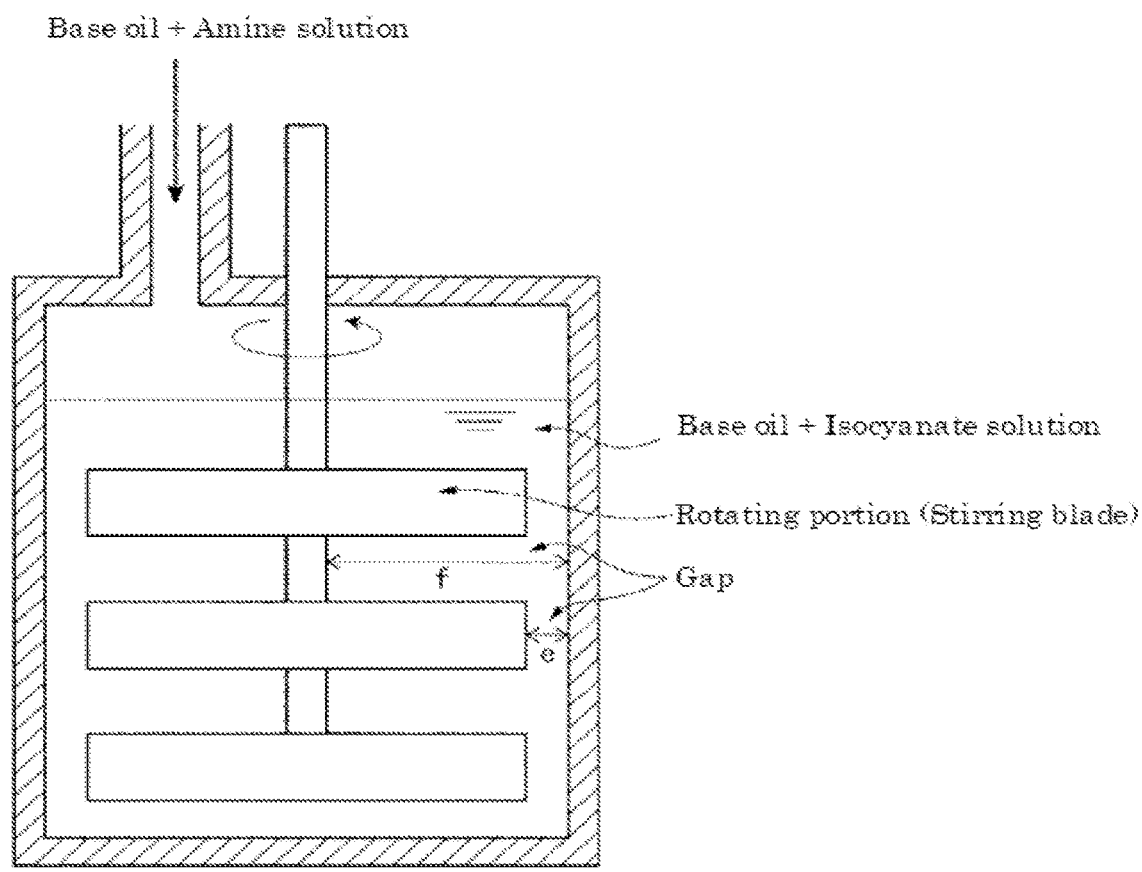
FIG. 3 is a schematic view of a cross section of a grease manufacturing apparatus used in Comparative Examples.

Using the grease manufacturing apparatus shown in FIG. 3, the solution (α) which had been heated at 70° C. was introduced at a flow rate of 504 L/h from the solution introducing pipe into the container body. Subsequently, the solution (β) which had been heated at 70° C. was introduced at a flow rate of 144 L/h from the solution introducing pipe into the container body containing the solution (α). After all the solution (β) was introduced into the container body, the stirring impeller was rotated, and while stirring was continued, the mixture was heated up to 160° C., and then kept as such for 1 hour to synthesize a urea grease (y-1).

On that occasion, a maximum shear rate (Max) was 42,000 $s^{-1}$, and stirring was performed by setting a ratio of a maximum shear rate (Max) to a minimum shear rate (Min) [Max/Min] to 1.03.

The urea-based thickener contained in the urea grease (y-1) corresponds to a compound of the general formula (b1) where $R^1$ and $R^2$ are selected from a cyclohexyl group and an octadecyl group, and $R^3$ is a diphenylmethylene group.

The molar ratio of octadecylamine to cyclohexylamine used as the raw materials (octadecylamine/cyclohexylamine) is 60/40.

(2) Preparation of Grease Composition (Y1)

In the above (1), the urea grease (y-1) discharged out from the grease manufacturing apparatus shown in FIG. 3 was stirred, then spontaneously left cooled, and the extreme-pressure agent (C5), the extreme-pressure agent (C6), the additive (D1), the additive (D2), and the additive (D3) were added thereto each in the blending amount shown in Table 2 to prepare a grease composition (Y1).

Comparative Example 2

(1) Synthesis of Urea Grease (y-2)

1.01 parts by mass of diphenylmethane-4,4'-diisocyanate (MDI) was added to 45.09 parts by mass of the base oil (A3) to prepare a solution (α).

1.26 parts by mass of octadecylamine and 0.31 parts by mass of cyclohexylamine were added to 44.53 parts by mass of the base oil (A3) that had been separately prepared, to prepare a solution (β).

Using the grease manufacturing apparatus shown in FIG. 3, a urea grease (y-2) was synthesized under the same condition as in (1) in Comparative Example 1.

The urea-based thickener contained in the urea grease (y-2) corresponds to a compound of the general formula (b1)

where $R^1$ and $R^2$ are selected from a cyclohexyl group and an octadecyl group, and $R^3$ is a diphenylmethylene group.

The molar ratio of octadecylamine to cyclohexylamine used as the raw materials (octadecylamine/cyclohexylamine) is 60/40.

(2) Preparation of Grease Composition (Y2)

In the above (1), the urea grease (y-2) discharged out from the grease manufacturing apparatus shown in FIG. 3 was stirred, then spontaneously left cooled, and the extreme-pressure agent (C5), the extreme-pressure agent (C6), the additive (D1), the additive (D2), and the additive (D3) were added thereto each in the blending amount shown in Table 2 to prepare a grease composition (Y2).

Comparative Example 3

(1) Synthesis of Urea Grease (y-3)

3.90 parts by mass of diphenylmethane-4,4'-diisocyanate (MDI) was added to 44.35 parts by mass of the base oil (A4) to prepare a solution (α).

4.89 parts by mass of octadecylamine and 1.20 parts by mass of cyclohexylamine were added to 42.16 parts by mass of the base oil (A4) that had been separately prepared, to prepare a solution (β).

Using the grease manufacturing apparatus shown in FIG. 3, a urea grease (Y3) was synthesized under the same condition as in (1) in Comparative Example 1.

The urea-based thickener contained in the urea grease (y-3) corresponds to a compound of the general formula (b1) where $R^1$ and $R^2$ are selected from a cyclohexyl group and an octadecyl group, and $R^3$ is a diphenylmethylene group.

The molar ratio of octadecylamine to cyclohexylamine used as the raw materials (octadecylamine/cyclohexylamine) is 60/40.

(2) Preparation of Grease Composition (Y3)

In the above (1), the urea grease (y-3) discharged out from the grease manufacturing apparatus shown in FIG. 3 was stirred, then spontaneously left cooled, and the additive (D1), the additive (D2), and the additive (D3) were added thereto each in the blending amount shown in Table 2 to prepare a grease composition (Y3).

Comparative Example 4

(1) Synthesis of Urea Grease (y-4)

1.95 parts by mass of diphenylmethane-4,4'-diisocyanate (MDI) was added to 44.15 parts by mass of the base oil (A1) to prepare a solution (α).

2.45 parts by mass of octadecylamine and 0.60 parts by mass of cyclohexylamine were added to 43.05 parts by mass of the base oil (A1) that had been separately prepared, to prepare a solution (β).

Using the grease manufacturing apparatus shown in FIG. 3, a urea grease (y-4) was synthesized under the same condition as in (1) in Comparative Example 1.

The urea-based thickener contained in the urea grease (y-4) corresponds to a compound of the general formula (b1) where $R^1$ and $R^2$ are selected from a cyclohexyl group and an octadecyl group, and $R^3$ is a diphenylmethylene group.

The molar ratio of octadecylamine to cyclohexylamine used as the raw materials (octadecylamine/cyclohexylamine) is 60/40.

(2) Preparation of Grease Composition (Y4)

In the above (1), the urea grease (y-4) discharged out from the grease manufacturing apparatus shown in FIG. 3 was stirred, then spontaneously left cooled, and the extreme-pressure agent (C5), the extreme-pressure agent (C6), the additive (D1), the additive (D2), and the additive (D3) were added thereto each in the blending amount shown in Table 2 to prepare a grease composition (Y4).

Comparative Example 5

(1) Synthesis of Urea Grease (y-5)

1.95 parts by mass of diphenylmethane-4,4'-diisocyanate (MDI) was added to 46.40 parts by mass of the base oil (A1) to prepare a solution (α).

2.45 parts by mass of octadecylamine and 0.60 parts by mass of cyclohexylamine were added to 45.30 parts by mass of the base oil (A1) that had been separately prepared, to prepare a solution (β).

Using the grease manufacturing apparatus shown in FIG. 3, a urea grease (y-5) was synthesized under the same condition as in (1) in Comparative Example 1.

The urea-based thickener contained in the urea grease (y-5) corresponds to a compound of the general formula (b1) where $R^1$ and $R^2$ are selected from a cyclohexyl group and an octadecyl group, and $R^3$ is a diphenylmethylene group.

The molar ratio of octadecylamine to cyclohexylamine used as the raw materials (octadecylamine/cyclohexylamine) is 60/40.

(2) Preparation of Grease Composition (Y5)

In the above (1), the urea grease (y-5) discharged out from the grease manufacturing apparatus shown in FIG. 3 was stirred, then spontaneously left cooled, and the additive (D1), the additive (D2), and the additive (D3) were added thereto each in the blending amount shown in Table 2 to prepare a grease composition (Y5).

Comparative Example 6

(1) Synthesis of Urea Grease (y-6)

1.95 parts by mass of diphenylmethane-4,4'-diisocyanate (MDI) was added to 44.25 parts by mass of the base oil (A1) to prepare a solution (α).

2.45 parts by mass of octadecylamine and 0.60 parts by mass of cyclohexylamine were added to 43.15 parts by mass of the base oil (A1) that had been separately prepared, to prepare a solution (β).

Using the grease manufacturing apparatus shown in FIG. 3, a urea grease (y-6) was synthesized under the same condition as in (1) in Synthesis Example Y1.

The urea-based thickener contained in the urea grease (y-6) corresponds to a compound of the general formula (b1) where $R^1$ and $R^2$ are selected from a cyclohexyl group and an octadecyl group, and $R^3$ is a diphenylmethylene group.

The molar ratio of octadecylamine to cyclohexylamine used as the raw materials (octadecylamine/cyclohexylamine) is 60/40.

(2) Preparation of Grease Composition (Y6)

In the above (1), the urea grease (y-6) discharged out from the grease manufacturing apparatus shown in FIG. 3 was stirred, then spontaneously left cooled, and the extreme-pressure agent (C1), the extreme-pressure agent (C2), the extreme-pressure agent (C3), the extreme-pressure agent (C4), the additive (D1), the additive (D2), and the additive (D3) were added thereto each in the blending amount shown in Table 2 to prepare a grease composition (Y6).

[Evaluation METHODS]

The urea greases (x-1) to (x-9) and the urea greases (y-1) to (y-6) synthesized in Examples 1 to 9 and Comparative Examples 1 to 6, and also the grease compositions (X1) to (X9) and the grease compositions (Y1) to (Y6) were evaluated as follows.

<Evaluation of Particle Size: Requirement (I)>

The particle size of the particles containing the urea-based thickener (B) in the grease composition was evaluated. Specifically, the urea greases (x-1) to (x-9) and the urea greases (y-1) to (y-6) synthesized in Examples 1 to 9 and Comparative Examples 1 to 6 were taken as measurement samples, and the particle size of the particles containing the urea-based thickener (B) therein was evaluated according to the following process.

First, the measurement sample was defoamed in vacuum, and filled in a 1-mL syringe. 0.10 to 0.15 mL of the sample was extruded out from the syringe, and the extruded sample was put on the surface of a tabular cell of a paste cell fixing tool.

With that, another tabular cell was put on the sample to prepare a measurement cell unit in which the sample was sandwiched between the two cells.

Using a laser diffraction particle sizer (trade name: LA-920, by Horiba, Ltd.), an area-based arithmetic average particle diameter of the particles (particles containing the urea-based thickener (B)) in the sample in the measurement cell unit was measured.

Here, "area-based arithmetic average particle diameter" means an arithmetically averaged value of a particle diameter distribution based on an area.

The area-based particle diameter distribution indicates a particle diameter frequency distribution in all the particles targeted for measurement, based on the area calculated from the particle diameter (in detail, the cross section of the particle having the particle diameter).

An arithmetic average value of the area-based particle size distribution is calculated according to the following expression (1).

$$\text{Arithmetic Average Particle Diameter} = \Sigma\{q(J) \times X(J)\} \pm \Sigma\{q(J)\} \quad (1)$$

In the expression (1), J means a division number. q(J) means a frequency distribution value (unit: %). X(J) means a representative diameter (unit: μm) in the Jth particle diameter range.

<Evaluation of Specific Surface Area: Requirement (II)>

Using the particle size distribution of the particles containing the urea-based thickener (B) in a grease composition, as measured in the above section of <Evaluation of Particle Size: Requirement (I)>, a specific surface area was calculated. Specifically, using the particle size distribution, a sum total of the surface area (unit: cm$^2$) of the particles per unit volume (1 cm$^3$) was calculated, and this is referred to as a specific surface area (unit: cm$^2$/cm$^3$).

<Evaluation of Torque Transmission Efficiency>

Figure 4:
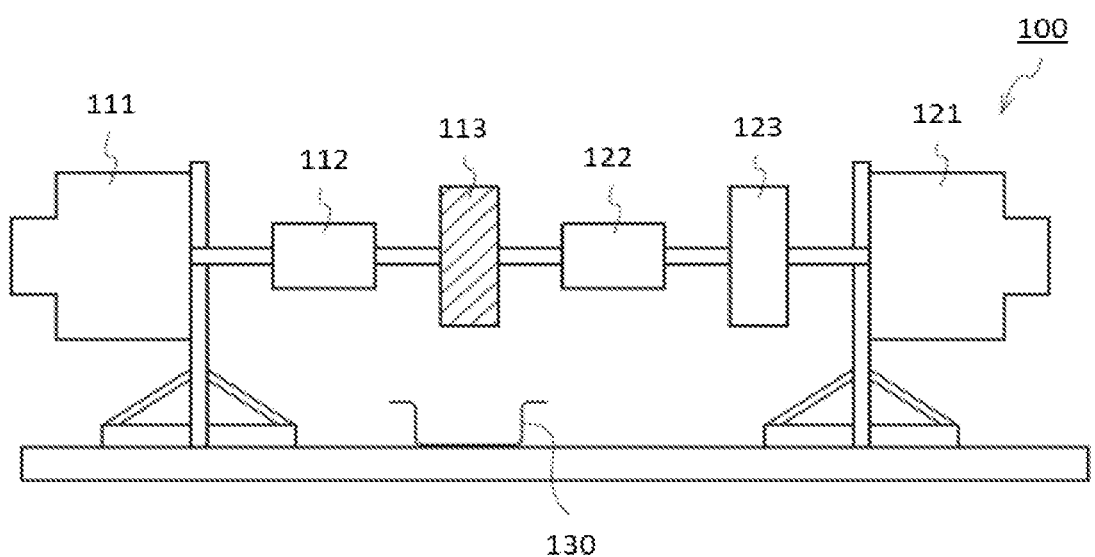
FIG. 4 is a schematic view of a measurement device used in measuring the torque transmission efficiency in Examples.

FIG. 4 is a schematic view of a device used in measuring the torque transmission efficiency in Examples.

The measurement device 100 shown in FIG. 4 has a input-side motor part 111, an output-side torque measuring unit 112, an input-side speed reducer 113 (trade name "RV-42N" by Nabtesco Corporation), an output-side torque measuring unit 122, an output-side speed reducer 123 (trade name "RV-125V" by Nabtesco Corporation) and an output-side motor part 121 connected in that order.

285 mL of a mixed grease was filled in the grease filling case (case inside temperature: 30° C.) that the input-side speed reducer 113 of the measurement device 1 shown in FIG. 4 has, then the measurement device 100 was driven under the condition of a load torque of 412 Nm and a rotation number of 15 rpm, and the rotation number and the torque on the input side and the output side were measured, and the torque transmission efficiency was calculated according to the following expression (2).

(Torque transmission efficiency (%))=(output-side torque (Nm))/[(input-side torque (Nm))×(reduction ratio)]×100   (2)

The reduction ratio is 141.

The torque transmission efficiency is an index that indicates the amount of loss of the inputted power until output thereof, and a lower torque transmission efficiency means a larger power loss, while, on the contrary, a higher torque transmission efficiency means a smaller power loss.

<Evaluation of Wear Resistance>

Using the prepared grease composition in accordance with ASTM D4170, oscillation operation was performed under the following conditions, and the depth of wear (mass reduction by fretting wear) was measured.

Bearings: Thrust bearing 51203
Load: 2940 N
Oscillation angle: ±0.105 rad
Oscillation cycle: 25 Hz
Time: 22 h
Temperature: Room temperature (25° C.)
Enclosure amount of grease composition: 1.0 g per bearing set A smaller depth of wear can be said to indicate more excellent wear resistance.

<Evaluation of Load Bearing Performance>

Using a four-ball tester under the condition of a rotation number of 1,800 rpm and an oil temperature of 18.3 to 35.0° C., the weld load (WL) was calculated according to ASTM D2596. A larger value of the weld load can be said to indicate more excellent load bearing performance.

<Evaluation of Grease Leak Prevention Performance>

The measurement device 100 of FIG. 4 used in evaluation of torque transmission efficiency was used. 285 mL (270.75 g) of a grease composition was filled in the grease filling case (case inside temperature: 60° C.) that the input-side speed reducer 113 has, then the measurement device 100 was driven under the condition of a load torque of 1030 Nm and a rotation number of 15 rpm, and the grease composition leaked out from the input-side speed reducer 113 during the operation was collected in the tray 130 set below the input-side speed reducer.

With that, the measurement device 100 was driven for 280 hours, then the "amount of leaked grease" collected in the tray 130 was measured, and the grease leak rate was calculated according to the following expression to evaluate the grease leak prevention performance of the tested sample.

[Grease Leak Rate (%)]=[leaked grease amount (g)]/[filled grease amount (=270.75 g)]×100

A smaller grease leak rate can be said to indicate more excellent grease leak prevention performance.

The evaluation results are shown in Table 1 and Table 2.

TABLE 1

|  |  |  | Example 1 | Example 2 | Example 3 | Example 4 | Example 5 | Example 6 | Example 7 | Example 8 | Example 9 |
|---|---|---|---|---|---|---|---|---|---|---|---|
|  | Kind of Urea Grease |  | x-1 | x-2 | x-3 | x-4 | x-5 | x-6 | x-7 | x-8 | x-9 |
| Grease | Kind of Grease Composition |  | X1 | X2 | X3 | X4 | X5 | X6 | X7 | X8 | X9 |
| Composition | Urea-based Thickener | cyclohexylamine mass % | 1.45 | — | — | 0.60 | 0.54 | 0.37 | 0.37 | 0.60 | 0.60 |
|  |  | octylamine mass % | — | — | 5.50 | — | — | — | — | — | — |
|  |  | octadecylamine mass % | 5.91 | 8.10 | — | 2.45 | 2.20 | 1.51 | 1.51 | 2.45 | 2.45 |

TABLE 1-continued

|  |  |  | Example 1 | Example 2 | Example 3 | Example 4 | Example 5 | Example 6 | Example 7 | Example 8 | Example 9 |
|---|---|---|---|---|---|---|---|---|---|---|---|
|  | (B) | MDI mass % | 4.71 | 3.88 | 5.49 | 1.95 | 1.76 | 1.20 | 1.20 | 1.95 | 1.95 |
| Extreme-Pressure Agent (C) | | extreme-pressure agent (C1) mass % | — | — | — | 0.60 | — | — | 0.60 | — | — |
| | | extreme-pressure agent (C2) mass % | — | — | — | 3.00 | — | — | 3.00 | — | — |
| | | extreme-pressure agent (C3) mass % | — | — | — | 0.40 | — | — | 0.40 | — | — |
| | | extreme-pressure agent (C4) mass % | — | — | — | 0.30 | — | — | 0.30 | — | — |
| | | extreme-pressure agent (C5) mass % | 1.50 | 1.50 | 1.50 | — | 1.50 | 1.50 | — | 1.50 | — |
| | | extreme-pressure agent (C6) mass % | 3.00 | 3.00 | 3.00 | — | 3.00 | 3.00 | — | 3.00 | — |
| Additive (D) | | additive (D1) mass % | 0.30 | 0.30 | 0.30 | 0.30 | 0.30 | 0.30 | 0.30 | 0.30 | 0.30 |
| | | additive (D2) mass % | 2.00 | 2.00 | 2.00 | 2.00 | 2.00 | 2.00 | 2.00 | 2.00 | 2.00 |
| | | additive (D3) mass % | 1.00 | 1.00 | 1.00 | 1.00 | 1.00 | 1.00 | 1.00 | 1.00 | 1.00 |
| Base Oil (A) | | base oil (A1) mass % | 80.13 | 80.22 | 81.21 | 87.40 | — | — | — | 87.20 | 91.70 |
| | | base oil (A2) mass % | — | — | — | — | — | 89.12 | 89.32 | — | — |
| | | base oil (A3) mass % | — | — | — | — | 87.70 | — | — | — | — |
| | | base oil (A4) mass % | — | — | — | — | — | — | — | — | — |
| Evaluation Result | Arithmetic average particle diameter of particle (μm) | | not more than 2.0 | not more than 2.0 | not more than 2.0 | not more than 2.0 | not more than 2.0 | not more than 2.0 | not more than 2.0 | not more than 2.0 | not more than 2.0 |
| | Measured value of arithmetic average particle diameter of particle (μm) | | 0.7 | 0.6 | 0.6 | 0.3 | 0.3 | 0.2 | 0.2 | 0.3 | 0.3 |
| | Specific surface area of particles ($\times 10^5$ cm$^2$/cm$^3$) | | 0.80 | 1.10 | 1.00 | 2.10 | 2.20 | 2.90 | 2.80 | 2.20 | 2.10 |
| | Worked penetration (25° C.) | | 242 | 244 | 256 | 390 | 400 | 445 | 448 | 390 | 390 |
| | Torque transmission efficiency (%) | | 54 | 55 | 57 | 82 | 84 | 87 | 84 | 85 | 81 |
| | Wear resistance ASTM D4170 depth of wear (mg) | | 2 | 3 | 1 | 11 | 4 | 3 | 6 | 3 | 8 |
| | Load bearing performance ASTM D2596 weld load (N) | | 2452 | 2452 | 2452 | 2452 | 2452 | 3089 | 3089 | 2452 | 981 |
| | Grease leak rate (%) | | 0 | 0 | 0 | 0 | 0 | 0 | 0 | 0 | 0 |

TABLE 2

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Grease Composition | Kind of Urea Grease | | y-1 | y-2 | y-3 | y-4 | y-5 | y-6 |
| | Kind of Grease Composition | | Y1 | Y2 | Y3 | Y4 | Y5 | Y6 |
| | Urea-based Thickener (B) | cyclohexylamine mass % | 1.80 | 0.31 | 1.20 | 0.60 | 0.60 | 0.60 |
| | | octylamine mass % | — | — | — | — | — | — |
| | | octadecylamine mass % | 7.34 | 1.26 | 4.89 | 2.45 | 2.45 | 2.45 |
| | | MDI mass % | 5.85 | 1.01 | 3.90 | 1.95 | 1.95 | 1.95 |
| | Extreme-Pressure Agent (C) | extreme-pressure agent (C1) mass % | — | — | — | — | — | 0.60 |
| | | extreme-pressure agent (C2) mass % | — | — | — | — | — | 3.00 |
| | | extreme-pressure agent (C3) mass % | — | — | — | — | — | 0.40 |
| | | extreme-pressure agent (C4) mass % | — | — | — | — | — | 0.30 |
| | | extreme-pressure agent (C5) mass % | 1.50 | 1.50 | — | 1.50 | — | — |
| | | extreme-pressure agent (C6) mass % | 3.00 | 3.00 | — | 3.00 | — | — |
| | Additive (D) | additive (D1) mass % | 0.30 | 0.30 | 0.50 | 0.30 | 0.30 | 0.30 |
| | | additive (D2) mass % | 2.00 | 2.00 | 2.00 | 2.00 | 2.00 | 2.00 |
| | | additive (D3) mass % | 1.00 | 1.00 | 1.00 | 1.00 | 1.00 | 1.00 |
| | Base Oil (A) | base oil (A1) mass % | 77.21 | — | — | 87.20 | 91.70 | 87.40 |
| | | base oil (A2) mass % | — | — | — | — | — | — |
| | | base oil (A3) mass % | — | 89.62 | — | — | — | — |
| | | base oil (A4) mass % | — | — | 86.51 | — | — | — |
| Evaluation Results | Arithmetic average particle diameter of particle (μm) | | more than 2.0 | more than 2.0 | more than 2.0 | more than 2.0 | more than 2.0 | more than 2.0 |
| | Measured value of arithmetic average particle diameter of particle (μm) | | 21.5 | 2.3 | 11.8 | 7.8 | 6.3 | 12.4 |
| | Specific surface area of particles ($\times 10^5$ cm$^2$/cm$^3$) | | 0.03 | 0.18 | 0.05 | 0.10 | 0.11 | 0.04 |
| | Worked penetration (25° C.) | | 170 | 470 | 280 | 380 | 380 | 380 |
| | Torque transmission efficiency (%) | | 36 | 78 | 51 | 68 | 71 | 72 |
| | Wear resistance ASTM D4170 depth of wear (mg) | | 42 | 28 | 35 | 31 | 42 | 41 |

TABLE 2-continued

| | Comparative Example 1 | Comparative Example 2 | Comparative Example 3 | Comparative Example 4 | Comparative Example 5 | Comparative Example 6 |
|---|---|---|---|---|---|---|
| Load bearing performance ASTM D2596 weld load (N) | 1961 | 1569 | 785 | 1961 | 618 | 1569 |
| Grease leak rate (%) | 0 | 12 | 5 | 14 | 17 | 9 |

The results in Table 1 and Table 2 verify the following.

First, from comparison between Comparative Example 1 and Comparative Examples 2 to 6, it is known that grease compositions that have been made soft by increasing the worked penetration could not secure grease leak prevention performance.

From comparison between Example 9 and Comparative Example 5 in which the extreme-pressure agent (C) was not blended, it is known that the grease composition satisfying the requirement (I) is excellent in both torque transmission efficiency and grease leak prevention performance and has good wear resistance and load bearing performance.

Further, as in Examples 1 to 8, the grease compositions blended with the extreme-pressure agent (C) and satisfying the requirement (I) are excellent in both torque transmission efficiency and grease leak prevention performance and have good wear resistance and load bearing performance. In particular, from comparison between Examples 1 to 3 and Examples 4 to 8, it is known that the grease compositions can be still excellent in torque transmission efficiency while being also excellent in grease leak prevention performance, even when the worked penetration is increased.

REFERENCE SIGNS LIST

1: Grease manufacturing apparatus
2: Container body
3: Rotor
4: Introduction portion
   4A, 4B: Solution introducing pipe
5: Retention portion
6: First concave-convex portion
7: Second concave-convex portion
8: Discharge portion
9: First concave-convex portion on the side of container body
10: Second concave-convex portion on the side of container body
11: Discharge port
12: Rotation axis
13: First concave-convex portion of rotor
   13A: Concave portion
   13B: Convex portion
14: Second concave-convex portion of rotor
15: Scraper
A1, A2: Gap

The invention claimed is:

1. A grease composition containing a base oil (A) and a urea-based thickener (B), which is used for speed reducers or speed increasers, wherein:
   a worked penetration at 25° C. of the grease composition is 380 to 450, and
   the particles containing the urea-based thickener (B) in the grease composition satisfy the following requirement (I):
   Requirement (I): the area-based arithmetic average particle diameter of the particles is 2.0 μm or less, as measured by a laser diffraction/scattering method.

2. The grease composition according to claim 1, wherein the particles containing the urea-based thickener (B) in the grease composition further satisfy the following requirement (II):
   Requirement (II): the specific surface area of the particles is $0.5 \times 10^5$ cm$^2$/cm$^3$ or more, as measured by a laser diffraction/scattering method.

3. The grease composition of claim 1, further containing an extreme pressure agent (C) of one or more selected from an organic metal-based extreme pressure agent, a sulfur-based extreme pressure agent, a phosphorus-based extreme pressure agent, and a sulfur-phosphorus-based extreme pressure agent.

4. The grease composition of claim 1, wherein the base oil (A) is one or more selected from a mineral oil, a hydrocarbon-based oil, an aromatic oil, an ester-based oil and an ether-based oil.

5. The grease composition of claim 1, wherein the kinematic viscosity at 40° C. of the base oil (A) is 10 to 400 mm$^2$/s.

6. The grease composition of claim 1, wherein the content of the urea-based thickener (B) is 1 to 15% by mass based on the total amount of the grease composition.

7. The grease composition of claim 1, wherein the urea-based thickener (B) is one or more selected from a diurea compound represented by the following general formula (b1):

$$R^1-NHCONH-R^3-NHCONH-R^2 \quad (b1)$$

wherein $R^1$ and $R^2$ each independently represent a monovalent hydrocarbon group having 6 to 24 carbon atoms, and $R^1$ and $R^2$ may be the same as or different from each other; $R^3$ represents a divalent aromatic hydrocarbon group having 6 to 18 carbon atoms.

8. The grease composition of claim 1, further containing an additive (D) of one or more selected from an antioxidant, a rust inhibitor, a dispersant and a metal deactivator.

9. A speed reducer having the grease composition of claim 1 in a lubrication part.

10. A speed increaser having the grease composition of claim 1 in a lubrication part.

11. A lubrication method for lubricating a lubrication part in a speed reducer or a speed increaser with the grease composition of claim 1.

* * * * *